US009160698B2

(12) United States Patent
Chestnut et al.

(10) Patent No.: US 9,160,698 B2
(45) Date of Patent: Oct. 13, 2015

(54) METHODS AND SYSTEMS FOR PROVIDING INFORMATION RELATING TO AN EVENT

(71) Applicant: The Rocket Science Group LLC, Atlanta, GA (US)

(72) Inventors: Benjamin Chestnut, Atlanta, GA (US); Andrew Connor, Cumming, GA (US); Valerie Warner Danin, Atlanta, GA (US); Amro Mousa, Alpharetta, GA (US); Stephen Martin, Atlanta, GA (US)

(73) Assignee: The Rocket Science Group LLC, Atlanta, GA (US)

( * ) Notice: Subject to any disclaimer, the term of this patent is extended or adjusted under 35 U.S.C. 154(b) by 0 days.

(21) Appl. No.: 14/078,295

(22) Filed: Nov. 12, 2013

(65) Prior Publication Data

US 2014/0379819 A1    Dec. 25, 2014

Related U.S. Application Data

(60) Provisional application No. 61/724,894, filed on Nov. 9, 2012, provisional application No. 61/799,580, filed on Mar. 15, 2013.

(51) Int. Cl.
*H04L 12/58* (2006.01)
*H04L 9/06* (2006.01)

(52) U.S. Cl.
CPC .............. *H04L 51/16* (2013.01); *H04L 9/0618* (2013.01); *H04L 51/10* (2013.01)

(58) Field of Classification Search
CPC .............................. H04L 9/0618; H04L 51/10
USPC .......................................... 713/168; 709/206
See application file for complete search history.

(56) References Cited

U.S. PATENT DOCUMENTS

| 6,125,281 | A | 9/2000 | Wells et al. |
|---|---|---|---|
| 7,151,932 | B2 | 12/2006 | Major |
| 7,363,026 | B2 | 4/2008 | Clarke et al. |
| 8,135,788 | B2 | 3/2012 | Clarke et al. |
| 8,417,269 | B1 | 4/2013 | Lin |
| 8,428,645 | B2 | 4/2013 | Rao |
| 2003/0209903 | A1* | 11/2003 | Morris ............................. 283/42 |
| 2004/0044673 | A1* | 3/2004 | Brady et al. ................... 707/100 |
| 2005/0033615 | A1* | 2/2005 | Nguyen et al. ..................... 705/5 |
| 2013/0067225 | A1* | 3/2013 | Shochet et al. ............... 713/165 |
| 2013/0159445 | A1* | 6/2013 | Zonka et al. .................. 709/206 |

* cited by examiner

*Primary Examiner* — Arvin Eskandarnia
(74) *Attorney, Agent, or Firm* — Kilpatrick Townsend & Stockton LLP

(57) ABSTRACT

An organizer may send information relating to an event to participants via text messaging without having participants' texting numbers. Particularly, organizer may be associated with a texting number. Organizer sets event's start/end times, and provides email addresses for event invitees. Email requests invitees' texting numbers to participate in event. Texting numbers are stored, and encrypted respectively as identifiers. Organizer's message for participants is sent as text message to participants' texting numbers between event's start/end, and may be sent as if the message originated from organizer's texting number. When event ends, participants' texting numbers are deleted unless a participant participates in organizer's later ending event. In response to invitation to organizer's later event, a received participant's texting number may be encrypted as later identifier, and compared with identifier from earlier event. If a match, organizer's text message sent to participant during prior event is included in organizer's or participant's conversational history.

7 Claims, 12 Drawing Sheets

METHODS AND SYSTEMS FOR PROVIDING INFORMATION RELATING TO AN EVENT

CROSS-REFERENCE TO RELATED APPLICATIONS

The present application claims priority to and benefit of the prior filed and commonly owned provisional applications, filed respectively in the United States Patent and Trademark Office on Nov. 9, 2012, assigned Ser. No. 61/724,894, entitled Methods and Systems for Providing Information Relating to an Event, and on Mar. 15, 2013, assigned Ser. No. 61/799,580 also entitled Methods and Systems for Providing Information Relating to an Event. Both provisional applications are incorporated herein by reference.

FIELD OF THE INVENTION

The invention relates to communications, and more particularly, relates to disseminating information relevant to participants and/or their activities in a timely and efficient manner. Even more particularly, the invention relates to disseminating that information via text message from the originator or author of the substance of the message to a participant, without the originator learning the texting number of the participant.

BACKGROUND

Organizing a function, especially on a large scale, is challenging. Among the challenges an organizer may face is the inability to communicate timely and efficiently with participants once invitations have been issued or the event has been announced. For example, the time or venue of a function may not be finalized at the time invitations are sent. Another example is that there may be unforeseen changes or last minute corrections to important event details such as the function's location or start time.

If the organizer has the mobile number or other numbers of the guests, the organizer may call to inform them of the changes. The organizer may have the correct numbers, but if the calls are not answered, or certain participants do not review voicemail messages, then those participants will not receive the change information. Moreover, it may be a very big and time consuming task to contact participants whether by mobile unit or telephone, especially if the number of expected guests or participants is large. Even if the task is undertaken, the change information may not reach the participants in time given the nature of the communication medium.

Another problem that limits calling as a method for communicating last minute changes is that many participants want to keep their communication numbers private or at least limited to a small circle. These participants are reluctant to pass on telephone numbers and especially mobile numbers. For functions other than those that are family or friend oriented, and especially for larger business-type functions, the organizer may not be able to collect mobile number information from potential participants. Their concerns may include the worry that the organizer would pass on the mobile numbers to third parties. These third parties may make use of such mobile numbers in ways considered undesirable participants such as solicitation calls, robo-calls, etc.

Another concern about giving away a mobile number is the potential cost of that action. Calls by an organizer and third parties may result in the owner of the account associated with that mobile number being charged for the calls. A person on a budget or who otherwise desires to minimize communication charges may not want to give up his or her mobile number to an organizer at all or at least not without assurance that such action will not result in additional charges to his or her mobile account.

The problem faced by an organizer in collecting mobile or telephone numbers is exacerbated when the text message number is the same as the participant's mobile number. Many people reserve text messaging only to family, close friends, and/or business or work colleagues. The nature of text messaging is among the reasons for keeping such numbers private. The participant of a text message typically considers review of such a message a high priority. The text message may report an emergency such as the sudden illness of a child at school, a friend's accident, or the urgent need to immediately report to work. To limit the receipt of text messages to the most urgent circumstances, the participants or invitees to a function may be very, very reluctant to submit their texting numbers to the organizer and the possible further (undesired) dissemination of that number to third parties.

Even those participants who do not treat the receipt of a text message with urgency do not desire generally to have their text message mailbox crammed full of spam. Another concern in revealing a texting number is that such revelation may lead to text messages that are scams and whose distribution is referred to as "smishing" of "phishing via text message". Both participants who severely restrict texting to family and friends, and participants who use texting more widely certainly do not appreciate the extra expense texting from third parties may cause. Nobody likes to pay for spam.

Referring to other methods of communication, the organizer may use electronic mail (email) to communicate change information. The organizer may relatively quickly disseminate the change information to participants via email, but only if the organizer has such addresses. Even so, the organizer may not have enough time to send all of the emails or the emails may not be viewed on a timely basis. Participants may not have access to or may not choose to access their email accounts close in time to the start of the function. For example, participants may be driving on their way to the function and without email access. Without accessing their email accounts, the participants will not receive the information about the changes.

Instead of email, an organizer may use a micro-blogging service such as Twitter® to communicate changes to a function. Twitter® users may send and receive text-based messages of up to 140 characters. Each such message is known as a Tweet®. The organizer of a function with last minute changes may send a Tweet® with change information to participants.

Tweeting about changes to a function, like calling participants or sending them emails, is problematic. The use of Twitter® shares the same type of problems posed by calling or emailing participants such as being unable to reach participants in a timely manner, and the participants having to timely check their Twitter® accounts in order to receive the information.

Twitter® also poses its own set of problems for the organizer of a function and its participants or invitees. For an organizer, he or she has to have thought ahead to obtain the Twitter® name of each participant or the organizer will be faced with a big task in finding such names. Typically, it is unusual for an organizer to have that information for functions that are not family or friend oriented. The organizer may be able to search for Twitter® names by using the actual names of the participants or invitees, but that search expands the task of communicating the changes to a degree that the Twitter® search/communication may not be worth the effort. Also, there may be Twitter® users with names common or very close to the names of the participants or invitees. Whether the organizer has the Twitter® names or uses the actual names of the guests, the organizer faces a big task in tweeting out the change information especially if there are a lot of participants and invitees.

Another problem for the organizer in the use of Twitter® to send out change information is that a Tweet® is limited to 140 characters. That may not be enough for an organizer to clearly communicate the details of the changes in function information.

In some cases, the organizer may not want to use Twitter® because the problems its use may generate. Twitter® messages are public. That may be a big problem if the organizer does not want people who have not been invited to the function to see the change information. For example, a Tweet® about changes to a celebrity wedding may result in attendance by people who have not been invited.

Further making the use of Twitter® problematic is the way its use may be viewed by participants or invitees to the function. To receive the change information via Tweet®, a participant has to be a user of Twitter®. Participants or invitees to a function may not want to join Twitter® just to receive change information. Even if a participant uses Twitter and regularly checks his or her tweets, he or she may not be a Twitter® follower of the particular function or the organizer. In that case, the participant would not receive the organizer's Tweet® with the change information.

Various privacy issues also may concern participants in an organizer's use of Twitter® for communication. One type of privacy concern is referred to herein as "activity privacy". A participant or invitee to a function may not want others to know of his or her participation. For example, an employee of Company A may not want his or her superiors at Company A to know that the employee plans to attend a recruiting a function sponsored by Company B. As another example, an invitee to a stag party or bachelorette party might not want those friends and family members who condemn, scorn or would make fun of such functions to learn of the invitee's participation. If the organizer uses Twitter® to communicate with participants, a particular participant's attendance (and/or other information) may become known to those he or she does not want to know the information.

Another kind of privacy concern that a participant may have relating to an organizer's use of Twitter® is referred to herein as "identity privacy". Some participants or invitees to a function may be concerned about personal information such as full name, address, birth date, account numbers, and personal identification numbers becoming known through third parties' access to Twitter® messages. Twitter® acknowledges that it collects personal information about its users and shares such personal information with third parties. A participant may be annoyed or even outraged at the organizer for making such personal information vulnerable via Twitter®.

Of the types of communications discussed above for communicating last minute change information to a participant, a text message may be optimal but for the risks associated with revealing the participant's texting number to the organizer. As stated, those risks may include the further dissemination of the texting number to unauthorized or unknown third parties. Such third parties may use the texting number to send the participant frivolous messages, obscene messages, unwanted sales and subscription pitches, and/or messages that may expose the participant to scams. Moreover, such unwanted messages may increase the participant's telecommunications costs. Thus, there is a need for a way for the participant to receive updates on last minute changes to functions and other late-breaking information without having to reveal his or her texting number.

The problems of an organizer of a function in communicating last minute changes to participants have been used as an example. Others share these problems in many different circumstances, especially where such last minute communications may be vital. For example, a soccer team manager may need to quickly distribute information about cancellation of a game. A surprise birthday planner may desire to keep details about a surprise party secret until the very last minute, and needs a way to communicate such details to invitees. An employer may need to let employees know of a last minute staffing schedule change. An airline may need to communicate a change in gate for arrival or departure of a particular flight. Many other examples may be provided.

In sum, there is a need for a way to disseminate information, especially last minute information, via text message from the originator of the substance of the message to a participant, without the originator learning the texting number of the participant.

SUMMARY

Generally stated, the inventions relate to disseminating information via text message from the author of the message to all of the participants in an event of the author, without the author learning the texting numbers of the participants. Embodiments of the invention are particularly suited to providing information from an event organizer in a temporarily urgent, instant communications situation. The inventions are described herein with references to examples and embodiments. The inventions, however, are not to be limited to the particular examples provided.

Advantageously, embodiments of the inventions provide information, such as last minute changes to an event, in a way so that the participants are likely to receive the information in a timely fashion and without the author of the information gaining access or knowledge of the respective texting numbers of the participants.

An exemplary embodiment of the inventions is referred to as the GATHER™ service. It may be characterized as an SMS (short message service) alert system that allows an event organizer to keep his/her attendees updated about and during an event. The event organizer may download an "app" (application software) to his/her mobile device to set up and run the GATHER™ service. Advantageously, participants do not have to download the GATHER™ app to participate, but may view the messages via their respective texting programs.

An event organizer may set up and run an event through such services as Eventbrite™ or Brown Paper Tickets™. As part of such services, the event organizer may ask invitees whether they would like to receive SMS updates about the organizer's event via the GATHER™ service. Thus, the GATHER™ service is not an event administration application or an RSVP tool. Rather, the GATHER™ service keeps participants to an event updated about information related to the event. The GATHER™ service fills the hole left open by event planning applications. The GATHER™ service allows an organizer of an event to provide participants with information while the event is in progress.

Information about the Eventbrite™ service may be found at www.eventbrite.com as of Oct. 12, 2013 (which is incorporated herein by reference) or obtained from Eventbrite™, 651 Brannan Street, San Francisco, Calif. 94107. Information about the Brown Paper Tickets™ service may be obtained from www.brownpapertickets.com as of Oct. 13, 2013

(which is incorporated herein by reference) or obtained from Brown paper Tickets™, 220 Nickerson, Seattle, Wash. 98109.

Advantageously, the GATHER™ service allows participants to an organizer's event to keep up with late-breaking information about the event. A participant, however, does not have to worry about being bothered with text messages after the event has ended. Once an event has ended, the GATHER™ service no longer sends messages to participants related to the event.

Another big worry that is overcome by the GATHER™ service is that a participant's text message number is never made known to the event organizer. The participant's texting number is deleted from the records of the GATHER™ service provider once the last event of an organizer in which the participant participates has ended. So, the participant does not have to worry about his/her texting number being used otherwise by the event organizer He/she never becomes aware of a participant's texting number. An event organizer cannot contact a participant after an event via text message at least for two reasons: first, as noted, the event organizer is never provided with a participant's texting number; and second, the participant's texting number is deleted once the event has ended (with the exception of a participant who participates in a later ending event of the organizer).

As noted, a participant's concerns about his/her texting number being distributed further than he/she intends are overcome with the exemplary GATHER™ service. Similarly, the concerns of an organizer about the privacy of his/her texting number are overcome. The GATHER™ service provides or allows an organizer to choose a GATHER™ number. Text messages to participants may appear to originate with the organizer's GATHER™ number. The GATHER™ number, however, is not the text messaging number of the event organizer Once an event ends, a text message from a participant to the GATHER™ number is not delivered to the event organizer (with the exception that such a text message may be delivered to the organizer if the participant participates in another later ending event of the organizer). Privacy, permission, and abuse prevention are top priorities in the exemplary embodiment of the GATHER™ inventions.

An advantage offered by the GATHER™ service is that it may be shared on social networks. The GATHER™ service may provide an event organizer with a short URL (uniform resource location) for sharing on social networks.

The GATHER™ service may be run by an ESP (email service provider). If a customer of the ESP has provided the ESP with a list(s) of email addresses, the customer may not have to duplicate the provision of a list of email addresses for the GATHER™ service. The customer may designate a previously provided list as the list for invitees to the GATHER™ service. For example, the GATHER™ service may provide a customer with a short URL to be "beamed up" so the invitation to the GATHER™ event is sent to one of the customer's lists previously provided to the ESP in connection with an ESP service.

Alternatively, the customer may use a list previously provided to the ESP to make a new list for GATHER™ services including one or more of the emails on the previously provided list. For example, a customer may create a list for his/her GATHER™ service that is a subset of a list previously provided to the ESP, or the customer may augment the list previously provided to the ESP with additional email addresses. Moreover, the subset list may be created based on common characteristics of email addresses on the ESP list such as geography, interests, name, etc.

Advantageously, an organizer's messages about an event may be texted to all of the event's participants at one time via the GATHER™ service. Participants receive the GATHER™ messages like all other text messages. A participant in a GATHER™ event does not have to download the GATHER app to communicate with the event organizer during the time of the event. Thus, a participant does not have to have a "smart device" to participate, but only needs to have a device that receives text messages. Moreover, an exemplary embodiment of the GATHER™ service allows an organizer to enable a public archive webpage to allow participants to use a web browser to find a list of all messages (or a segment of messages) related to the event of the event organizer.

Thus, an organizer's sending of a GATHER™ message to his/her group of attendees is as easy as sending a text message to friends. The GATHER™ service may be made to work with other services to include additional features. For example, the GATHER™ service may be made to work with the Foursquare Venues Platform so that the GATHER™ service may provide location information in connection with its information distribution. An advantage of an exemplary GATHER™ embodiment with the Foursquare Venues Platform is that it allows an event organizer to drop a pin of his/her current location or nearby places. This feature is great if venue of the event has a last minute change, or for sending announcements like "Hey folks, Mark is having lunch at Mellow Mushroom on $4^{th}$ Ave, and you're invited to join him under the tree outside."

Information about the Foursquare Venues Platform may be found at https://developer.foursquare.com (as of Oct. 9, 2013). The information at that web address is incorporated herein by reference. The Foursquare Venues Platform also may be referred to as and/or include the Foursquare API.

Yet another advantage of the GATHER™ service is that it allows participants to communicate with the event organizer. For example, if an organizer's message is unclear or lacks data, a participant may respond by asking for clarification. The participant may communicate by reply text message to the text message received as if from the event organizer. In an embodiment of the GATHER™ service, a participant may reply to an organizer's message via email. The organizer may respond to the participant's reply. This "conversation" or elements of it between the organizer and participant are selectably presented to the organizer and the participant during the event. If a participant participates in a later event of the organizer, the conversational history during the first event may be selectably presented to the organizer and the participant. For the organizer, these communications with participants may be organized by participant as conversational histories or discussions.

Near the end of an author's event, the author may want to send a message to participants about the approaching deadline. Advantageously, the GATHER™ service may provide the author with a reminder of an approaching deadline so that the author may timely send his/her message. Similarly, the author may wish to send a thank you to participants in an event just before its conclusion. The GATHER™ service may be configured to remind the author of the approach of the end of an event so that the author may send the "thank you" or other message to all participants.

Other features and advantages of the invention may be more clearly understood and appreciated from a review of the following detailed description and by reference to the appended drawings and claims.

BRIEF DESCRIPTION OF THE DRAWINGS

To further clarify the above and other advantages and features of the inventions, a more particular description of embodiments of the inventions is provided below with reference to the appended drawings. They depict only typical embodiments (or aspects thereof) of the invention, and therefore, are not to be considered to limit the scope of the inventions. The inventions are described with additional specificity and detail through the use of the accompanying drawings in which.

DETAILED DESCRIPTION

Very generally stated to introduce the inventions with an overview, the inventions include methods and systems for providing information relating to an event. Advantageously, in an exemplary embodiment, an event organizer may send real time messages to participants in the event. Typically, the messages include information relating to the event. The participants have agreed to receive the information in the form of messages (such as text messages) to their respective communication devices. The agreement by the participants includes submission of their respective communication numbers (i.e., mobile unit or device numbers) to a service provider implementing the service for the event organizer. The service provider does not provide the communication numbers to the event organizer at any time. During the event, the event organizer and any participant may engage in back and forth communications that may be organized for each as a conversation relating to the event and available for display. At the end of the event, the respective communication numbers of the participants are deleted from the records of the service provider.

In an embodiment, a participant's communication number may be retained after the end of an event by the service provider in certain circumstances such as the participation by the participant in another later-ending event of the event organizer Advantageously, in an embodiment, a participant/event organizer's communications during prior events may be presented as historic conversations between them during a current event in which they are participating.

The inventions are described herein with reference to exemplary embodiments, alternative embodiments, and also with reference to the attached drawings. The inventions, however, may be embodied in many different forms from those described or drawn herein, may be carried out in a variety of ways, and should not be construed as limited to the embodiments set forth in this description and/or the drawings. The exemplary embodiments that are described and shown herein are only some of the ways to implement the inventions. Elements and/or actions of the inventions may be assembled, connected, configured, and/or taken in an order different in whole or in part from the descriptions herein. In some cases, actions of the inventions may occur simultaneously.

Paths of Communications of an Embodiment of the Inventions

Figure 1A:
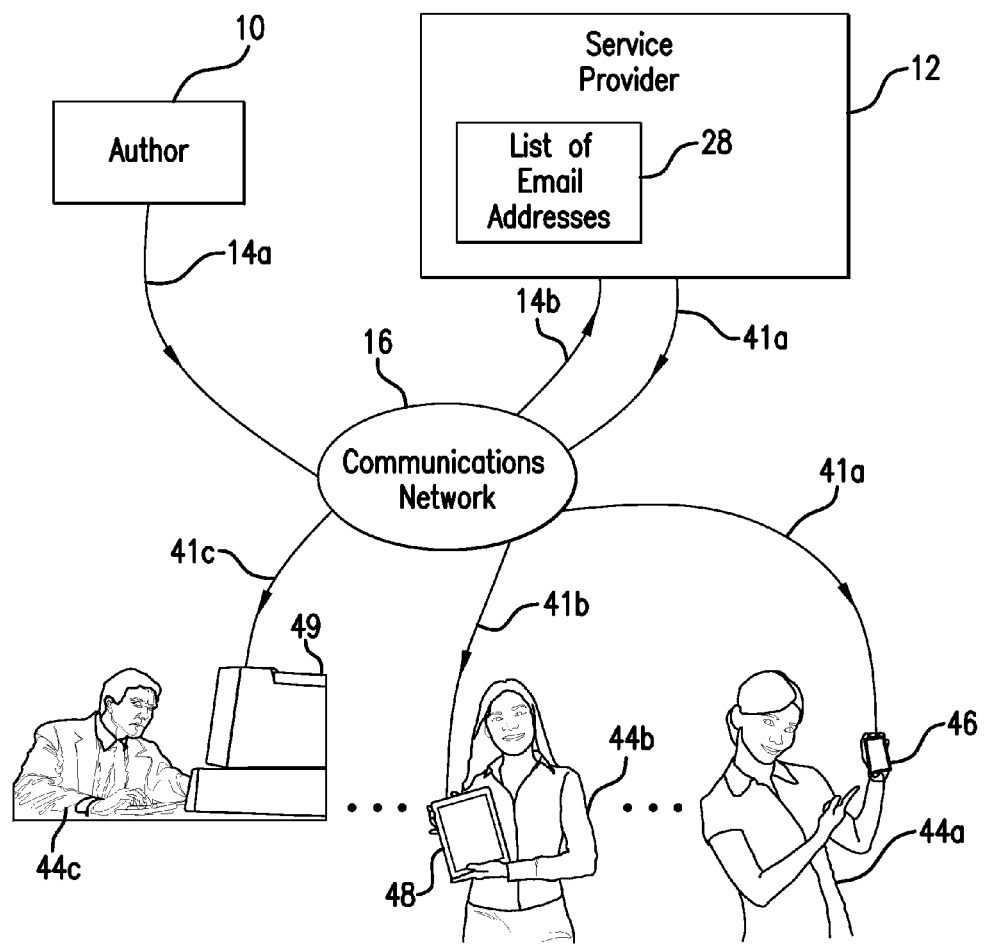
FIGS. 1a, 1b, and 1c are graphic representations of an exemplary overview of the sequential paths of communications that are transmitted in operation of a text message multiplexing and notification service embodiment of the inventions.
Figure 1B:
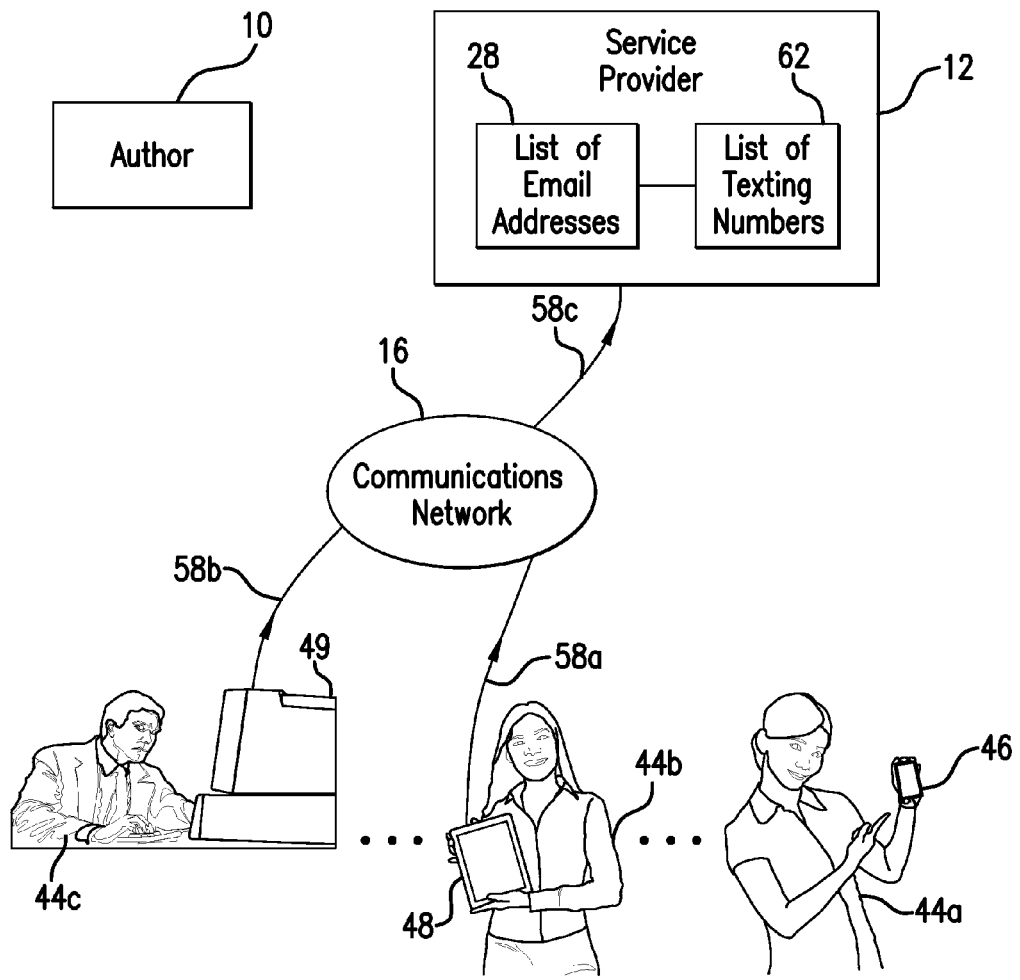
Figure 1C:
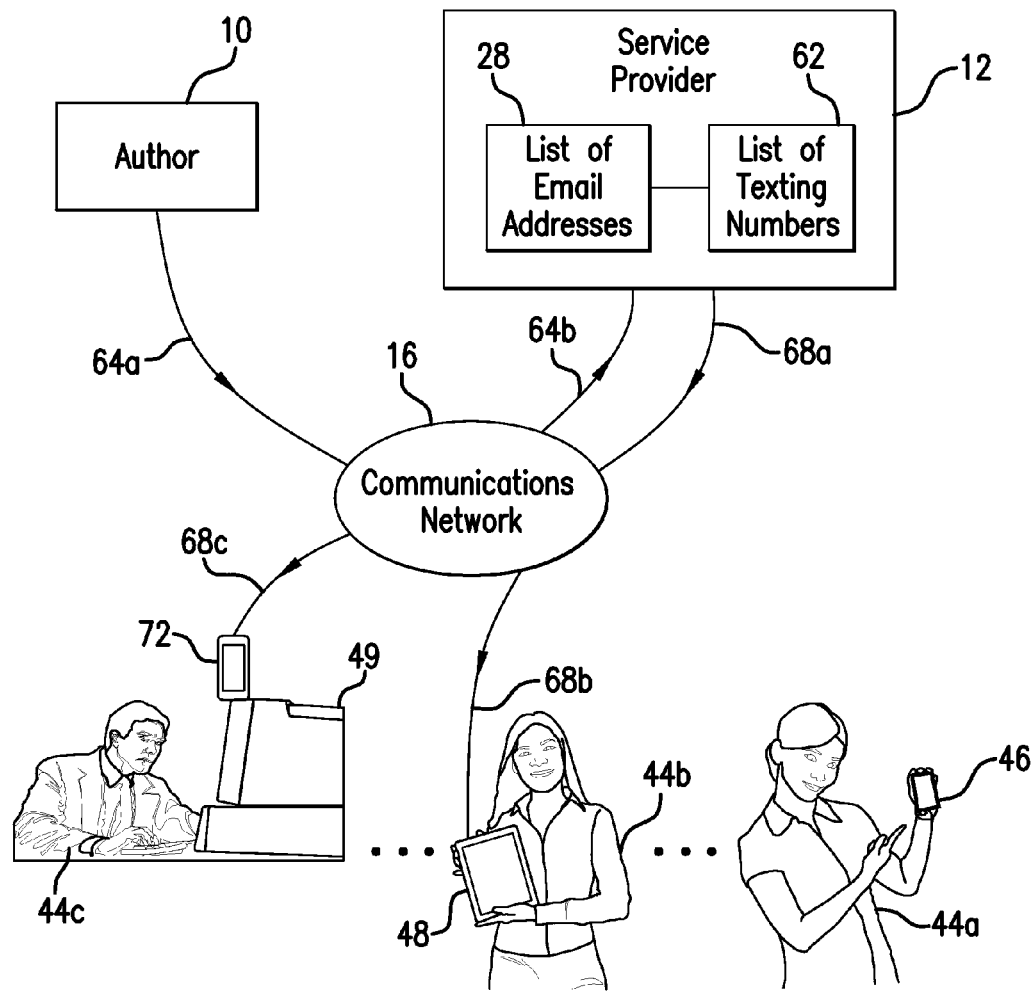

FIGS. 1a, 1b, and 1c graphically provide an exemplary overview of the sequential paths of communications that may be transmitted in operation of an embodiment of the inventions. This embodiment may be referred to as a text message multiplexing and notification service. This embodiment also may be referred to herein as the "service," "text message multiplexing and notification system", or "text notification service." In addition, this embodiment may be referred to herein by its service mark "GATHER™" or "GATHER™ service".

Referring to FIGS. 1a-1c, for the reader's convenience, a particular communication path between one party to another in the exemplary embodiment is marked by arrows having the same number to show continuity of the path, but different letters on either side of the communications network 16. For example, arrow 14a indicates that part of the communication path from the event organizer 10 to the service provider 12 that is transmitted by the event organizer 10 to the communications network 16. Arrow 14b indicates that part of the same communication path, but from the communications network 16 to the service provider 12. The types of communications carried on the paths may vary.

The Service Provider

A service provider 12 may make the GATHER™ service available for enrollment and participation. The service provider 12 may implement part or all of the service. In the example described in association with FIGS. 1a, 1b, and 1c, the service provider 12 is a single entity. In other examples, however, the elements and/or functions of the service provider 12 may be implemented through and/or carried out by one or more entities, and/or distributed among one or more elements. The service provider 12 may also be referred to herein as a "multiplexer", "text message multiplexer", or the GATHER™ service provider.

In this description, the terms "the GATHER™ service" and "the GATHER™ service provider" may be used interchangeably in that the GATHER™ service provider is carrying out the GATHER™ service.

Figure 9:
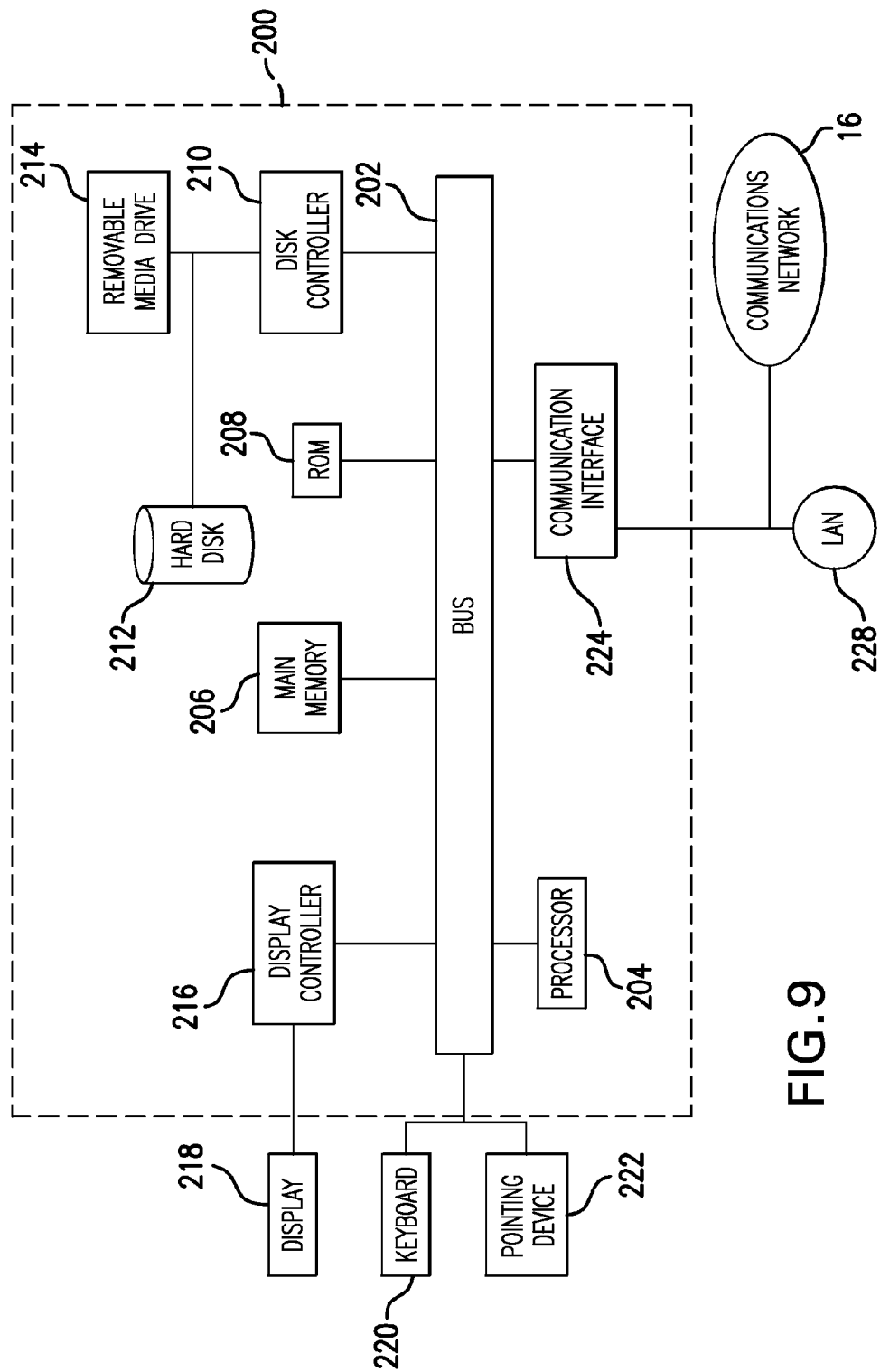
FIG. 9 is a block diagram of an exemplary computer system that may be programmed to implement the inventions.

The service provider 12 may implement the GATHER™ service using a computer system such as the one shown in FIG. 9, but may implement the service by any other suitable device(s) including personal computer, computer, workstation, or server for communicating through the communications network 16 with the event organizer 10, with a short messaging service (SMS) provider (not shown), or the invitees and participants relating to the GATHER™ service.

An electronic mail (email) service provider ("ESP") is an example of a service provider that may offer customers an embodiment of the inventions such as the GATHER™ service. Of course, other types of entities may offer services such as the GATHER™ service.

As is described in more detail below, an ESP may store one or more email address lists on behalf of a customer of its ESP services. In ESP services, the ESP stores a customer's email list so that the customer may instruct the ESP to send an email to the email addresses on the list. If the ESP offers a GATHER™ service, the customer may authorize the ESP to use one or more of the email address lists the customer previously provided to the ESP in connection with ESP services, but for use in a GATHER™ service also provided by the ESP. Advantageously, the customer does not have to duplicate the provision of email address list(s) between an ESP and another service provider when the customer's ESP offers a GATHER™ service.

Additional information about ESPs and ESP services is provided immediately below. This information is provided because there may be crossover between an ESP and its ESP services and the exemplary service provider 12 of a GATHER™ service.

Generally, an ESP is an entity, which offers email marketing or bulk email services. A "customer" or "user" may make use of the ESP services. To accomplish ESP functionality, the ESP may include a send engine(s), which allows for the distribution of a user's email messages to the user's subscribers or contacts. The email addresses of the respective contacts may be contained in an email address list associated by the ESP with the customer. A customer may provide the ESP with more than one email address list. ESPs also often offer a user one or more ways to segment an email address list into interest groups or categories. The segmentation allows the user to cause an email(s) to be sent by the ESP to a subset(s) of contacts on a particular email address list.

As part of its ESP service offered to a user, an ESP may provide the user with tracking information showing the status of each email sent to each contact on an email address list. An ESP may provide one or more ESP services with features such as the following:

A user may create templates and/or may use templates premade by the ESP and/or otherwise for sending email message(s) to contacts;

A user may provide the ESP with one or more contact lists (email address lists) for distributing emails. A contact list may be enhanced with custom field(s) to hold additional information for one or more of the contacts. The custom field(s) may be used for filtering and targeted messaging purposes;

An ESP may update a user's email address list to suppress the contact(s) requesting to be unsubscribed from emails from the user;

An ESP may provide one or more statistical reviews of each email sent to a user's contacts to measure the success rate of the user's email campaigns;

An ESP may test email templates for compatibility with email applications;

An ESP may carry out spam testing with respect to an email template to gauge the score of an email campaign and/or a particular email against known factors that may place the template at risk of being blocked;

An ESP may have the ability to send emails in Hyper Text Markup Language ("HTML") and/or plain text formats to improve delivery success rates (known as Multi-Part Multi-Purpose Internet Mail Extensions ("MIME")); and/or An ESP may have the ability to customize dynamically the content of emails that are sent out, and to tailor personalized and relevant communications.

Generally, an ESP may follow policies, also known as terms and conditions (such as an "Acceptable Use Policy"), which are meant to prevent abuse by users in order to ensure that no spam is sent through the ESP's systems. Following the policies, an ESP typically intends to provide the best possible delivery rates, with no messages blocked as spam.

Messages

Reference now is made to further description of an exemplary embodiment of the inventions, and in particular, to the manner in which an exemplary embodiment transmits information received from an event organizer to participants in the event. An exemplary embodiment of the invention uses a Short Message Service (SMS) as a communication tool to send, receive and/or relay text messages between an event organizer (via the GATHER™ service provider) and participants in an event of the event organizer Other communication methods and systems may be used. For example, push notifications or messages over any socket connection via any protocol (a custom protocol, Hypertext Protocol (HTTP) or the like) may be used. A socket connection is defined herein as a unique connection from a computer or Internet connected device to another, e.g., a persistent connection from smart phone application, such as an iPhone or Android application, to a server(s) of the service provider or a third party's server(s).

Event Organizer

A person, entity, or device may desire to make use of the GATHER™ service offered by the service provider 12. Hereinafter, the term "person" or "persons" and personal pronouns such as "he, she, his, her, they, their, them" are defined to include an "entity" or "entities" and "device or devices", unless otherwise noted. For example, a computer may be programmed to assume the person's role. The person 10 may also be referred to herein as an "author," "customer", "event host", "event organizer", "message originator", "organizer", "originator", or "user".

The event organizer 10 may contact the service provider 12 to make use of the service, respond to an inquiry from the service provider 12, and/or for other reasons. As shown in FIG. 1a, the event organizer 10 may communicate (as indicated by arrow 14a) through a communications network 16 (as indicated by arrow 14b) with the service provider 12.

Communications Network

The communications network 16 may include telecommunications network(s) and system(s) as well as data network(s) and system(s) including the Internet (also referred to as the "World Wide Web" or "Web"). All of the communications relating to the exemplary GATHER™ service pass through the communications network 16 in a conventional manner known to those skilled in the art. Henceforth, the involvement of the communications network 16 in communications is assumed and not specifically pointed out unless otherwise noted.

SMS App for the GATHER™ Service

In the exemplary embodiment, the service provider 12 makes a web-based Short Message Service (SMS) application or "app" for the GATHER™ service available to potential event organizers. A Web-based application refers to any program that may be accessed over a network connection using the hypertext transfer protocol (HTTP) or otherwise, rather than existing within a device's memory. Web-based applications often run through a Web browser. However, Web-based applications also may be client-based, where a small part of the program is downloaded to a user's device, but processing is done over the Internet on an external server. Advantageously, as explained further below, the participants in an event of the event organizer 10 do not have to download an app to communicate with the event organizer during the time of the event. Thus, a participant does not have to have a "smart device" (as explained below) to participate.

Communications Device

The event organizer 10 may download and use the GATHER™ app with his or her communications or other device to make use of the GATHER™ service. Typically, the event organizer 10 may download the GATHER™ service app to his or her smart device. Generally, a "smart device" may be capable of voice, text and video communication, Internet browsing, geo-locating (for search purposes), and/or may operate to some extent autonomously. Nonetheless, the event organizer 10 may make use of any device that allows him or her to communicate with the service provider 12 and participants in connection with an implementation of the invention. In some cases, the event organizer 10 may use a particular type of device to enroll in the GATHER™ service, and a different type of device to make use of the service. Hereinafter, "communications device" or "device" is used to include any device(s) the event organizer 10 may use to communicate with the service provider 12 in connection with an implementation of the invention, unless otherwise noted.

The service provider 12, of course, may communicate with the event organizer 10 in any appropriate manner to enroll the event organizer 10 in the GATHER™ service. Arrows indicating the communication paths from the service provider 12 to the event organizer 10 are not included in FIG. 1a for simplicity in explaining the set up of the service for the event organizer 10.

Figure 2:
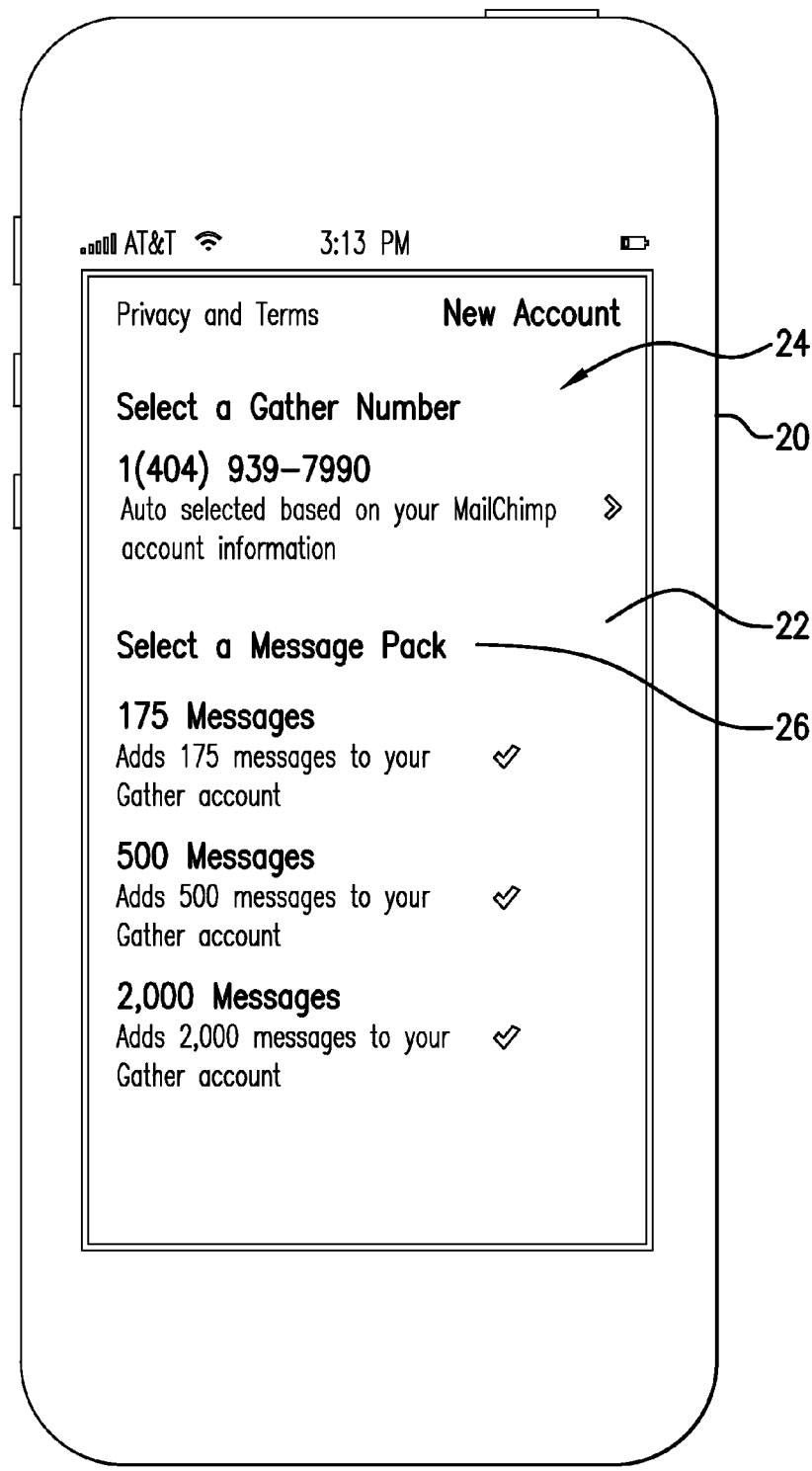
FIGS. 2-7 illustrate information as may be presented to an author, invitee, or participant in a screen shot on a mobile unit according to an exemplary embodiment.

FIG. 2—Enrollment in the GATHER™ Service

FIG. 2 shows a way for an event organizer 10 to enroll in an embodiment of the GATHER™ service. In this example, the event organizer 10 has downloaded the GATHER™ app to his or her device 20, and has opened the app to begin enrollment. In particular, FIG. 2 shows a device 20 displaying a screen shot 22 provided by the GATHER™ app. The screen shot 22 provides the event organizer 10 with exemplary directions and information regarding the GATHER™ app to set up a new account with the GATHER™ service.

GATHER™ Number

The event organizer 10 may be provided with a GATHER™ number 24 for use in connection with his or her GATHER™ account as shown in FIG. 2. Another embodiment of the service may offer the event organizer 10 two or more numbers from which the event organizer chooses a GATHER™ number. In the exemplary embodiment, the GATHER™ number may be any communications number that is not a "toll" number such as an 800 number. The event organizer 10 may activate a number geographically local to the event organizer 10, to one or more of the participants of a group, and/or to the locale of an event associated with the group. This number may be provisioned via a third party telephony provider, or as noted provided directly by the service provider 12. A third party telecommunications provider may provide the GATHER™ number 24, or the service provider 12 may provide the number 24.

The GATHER™ number 24 may be used as a means of identification for communications between the event organizer 10 via the service provider 12 and participants in the organizer's event as is described in further detail below.

In the exemplary embodiment of the inventions, the event organizer 10 is associated only with a single GATHER™ number even though he/she may organize more than one event. The events of an event organizer are distinguished by the respective names given to the events, which are (in this embodiment) also the respective names of the email lists the event organizer provides when setting up an event. Other embodiments may distinguish between or among event organizers in ways other than by a GATHER™ number or the like. Other embodiments also or alternatively may distinguish between or among events of an event organizer in ways other than by the respective names of the events and/or email lists.

Other Enrollment Actions

The event organizer 10 may carry out other actions to enroll in the GATHER™ service. For example, as shown in the screen shot 22 in FIG. 2, the event organizer 10 may select a payment plan 26 for use of the service. The payment plan 26 may be based on the number of text messages sent and/or received using the service and/or otherwise. Even if the GATHER™ service is free, there may be other information the event organizer 10 may have to supply to implement the service.

As noted, the exemplary embodiment of the inventions enrolls an event organizer in the GATHER™ service prior to providing such service. Other embodiments of the inventions may vary.

An Event

Once enrolled, the event organizer 10 may use the GATHER™ app to create one or more events to make use of the GATHER™ service. Other embodiments of the inventions allow the event organizer 10 to create a GATHER™ event in other ways (such as by email) besides use of the GATHER™ app.

An "event" in the GATHER™ service is defined in one aspect by a time period during which the event organizer 10 may be in communication with participants in the event via text messaging. In the exemplary embodiment, an event's time period may begin immediately or begin at a selected time in the future up to a year from the time current at the event's creation. An event's time period may end at any point after the event's beginning. In the exemplary embodiment, an event may be scheduled to end up to a year from its beginning Other embodiments may have different time limitations.

Each event of an event organizer has its own set of invitees and participants. For example, an event organizer may organize an event called MAILCHIMP® MEETUP and another event called MAILCHIMP® AFTERDARK. The event organizer may designate email list A to be used to invite people to participate in the MAILCHIMP® MEETUP event. The event organizer may designate a part of email list A (a subset of email addresses) to be used to invite people to the MAILCHIMP® AFTERDARK event.

Even though each event has its own set of invitees and participants, two or more events may have duplicate sets of invitees and/or participants. For example, an event organizer may use the same list of invitees for the MAILCHIMP® MEETUP event and also for the MAILCHIMP® AFTERDARK event. The participants, however, may be different for the two events if one or more invitees differ in accepting/rejecting participation.

Public Archive Webpage for Messages of an Event

In an alternative embodiment of the inventions, an event organizer may enable a webpage for an event through use of the GATHER™ service. The webpage may be public and may serve to archive or collect and display all the messages transmitted during the event. The webpage may be identified and located by a uniform resource locator (URL) or web address provided the service provider. The organizer may supply information for web address for the public archive webpage for the event such as by specifying the name of the event. Advantageously, anyone with a web browser may access the public archive webpage for an event and see a list of messages related to the event. A webpage with an event's messages may be useful to those participants and others who want to keep up with an event remotely or who just want to see what's going on from a browser instead of a wireless device.

The public archive webpage feature of the GATHER™ service may be variously configured, and the configuration(s) may be chosen by the organizer of an event. In some cases, the GATHER™ service may limit the configurations available. One configuration of the public archive webpage feature includes a limitation on access to the webpage. An organizer may to choose to limit access to an event's webpage to only participants in that event. In that case, a participant may have to receive a password from the organizer or the GATHER™ service provider to access the webpage. A participant who desires to view messages in a public archive webpage related to an event may be allowed to set up an account by supplying data such as user name, texting number, and/or email address. One or more elements of the data may be used to identify the conversations across events in which a participant participates. Once identified, the conversations may be linked so the participant may view them on a webpage.

Another configuration of the public archive webpage feature is related to the timing of the enablement of the webpage. For example, a configuration may allow enablement of a webpage only when the event is first created. Another configuration may allow a webpage to be enabled after the event has been created such as during the event. In that configuration, the organizer may be able to specify whether all messages are to be included in the public archive webpage for the event or only those messages transmitted after enablement of the webpage. In another configuration, the organizer may enable a webpage after the event has ended. All of the messages transmitted during the event may be included in the webpage or only those messages with one or more specified characteristics such as identity of sender, date of transmission, etc.

A configuration of the public archive webpage feature may allow the organizer of the event (and/or others) to edit messages that are archived in the webpage. For example, an organizer may correct a typo in an archived message.

Naming an Event, Email Lists, Invitees, and Sub-Groups of Invitees

When setting up an event to be implemented by the GATHER™ service, an event organizer 10 may name the event. For example, the reader is referred to FIG. 3, which shows the mobile device 20 displaying a screen shot 30 in the GATHER™ app having a box 32 with the event name "MAILCHIMP® MEETUP". Typically, the name of the event relates to a function with which the event organizer 10 is involved or otherwise associated, and to which one or more people may be invited or otherwise associated as participants.

As part of setting up the event to be implemented by the GATHER™ service, the event organizer 10 may provide the service provider 12 with a list of email addresses 28. The list 28 may include one or more email addresses for the person or people who are to be invited to participate in the GATHER™ service with respect to the event named by the event organizer 10. The list of email addresses 28 for an event may be named after that event. Thus, the list of email addresses 28 for the event named "MAILCHIMP® MEETUP" also may be named "MAILCHIMP® MEETUP".

The people "to be invited" also may be referred to as "invitees". An "invitee" is to be distinguished from a "participant". The group of invitees may be more in number than the related group of participants. For example, an invitee may decline the invitation to participate in the service. In this example, all participants are invitees, but not vice versa. As with an event organizer, an invitee or participant should not be limited to a person even though the invitees and participants herein are characterized as people such as by the use of personal pronouns when referring to them.

Participants have accepted an invitation from the event organizer 10 to participate in an event using the GATHER Service™. Participants also have provided the GATHER™ service provider 12 with a wireless number to receive and send text messages during the event. A "participant" may also be referred to herein as "recipient" or as an "attendee".

Also in this example, it is assumed that each email address in the list 28 corresponds to a respectively different invitee. In other examples, an invitee may be associated with more than one email address in the list 28 such as in the case when an event organizer's email address list includes a home email address for an invitee as well as a business email address for the same invitee.

The list of email addresses provided or designated by the event organizer 10 for a particular event may be stored by the GATHER™ service provider 12 in association with information on the event organizer 10 so that the list may be used for other event(s) and/or otherwise.

Figure 3:
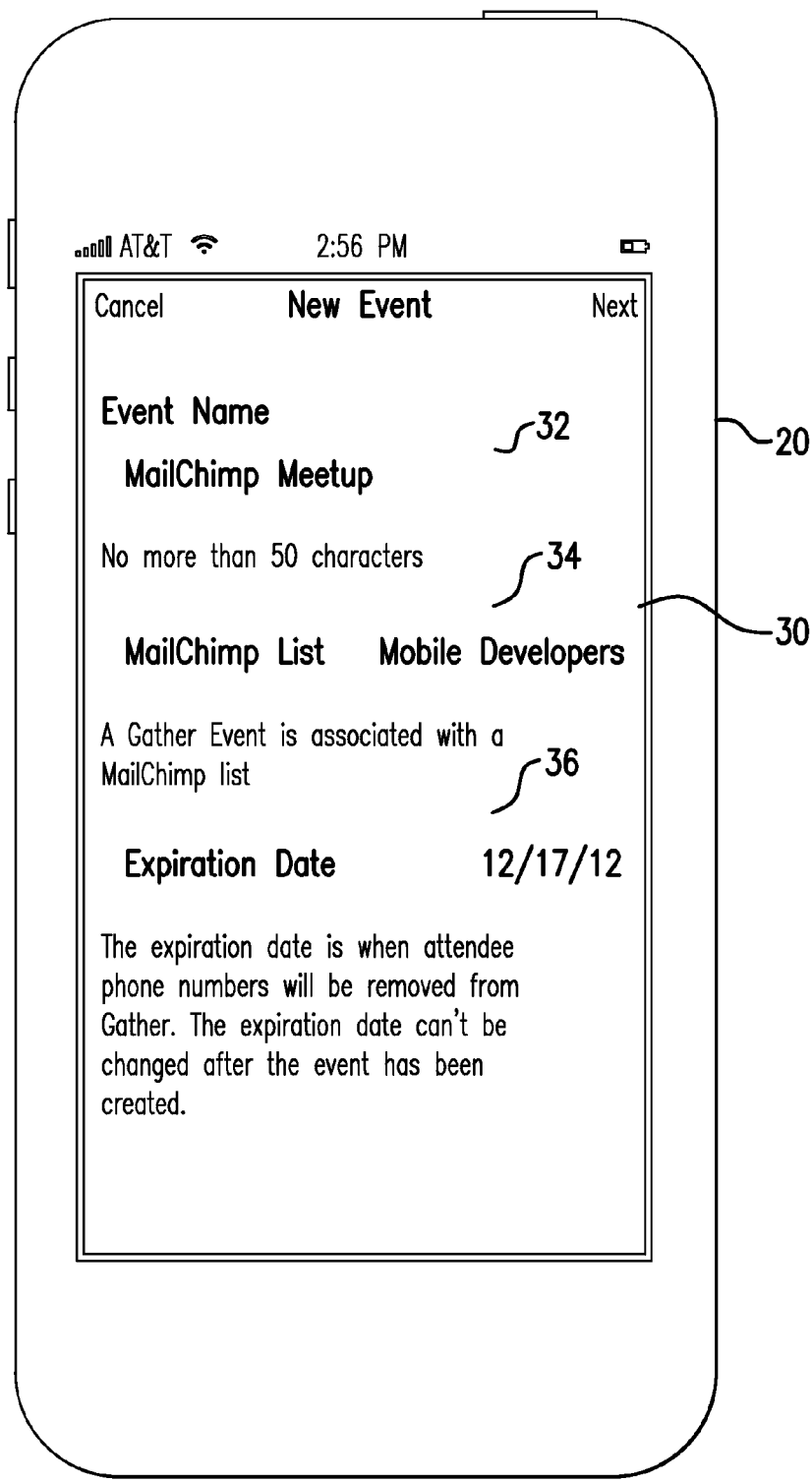

If the event organizer 10 already is a customer of the GATHER™ service provider 12 and/or another service of the GATHER™ service provider 12, the event organizer 10 may have previously provided a list(s) of email addresses 28 to the GATHER™ service provider 12. For example, the event organizer 10 may have previously provided an email address list 28 such as in connection with a previous GATHER™ event. As another example, the event organizer 10 may have previously provided a list 28 in connection with another service run by the GATHER™ service provider 12 such as an ESP service.

Where the event organizer 10 has previously provided a list(s), the GATHER™ service provider 12 may provide the event organizer 10 with the option of choosing from one or more of the lists previously provided by the event organizer 10. The GATHER™ app may display the previously provided lists to the event organizer 10. The event organizer 10 may then choose which list(s) the service provider 12 is to use with respect to the event named by the event organizer 10. FIG. 3 shows a box 34 on the screen shot 30 of the device 20. In this example, the event organizer 10 has selected the "MailChimp® List" identified as "Mobile Developers" as the list of emails to be used with respect to the MailChimp® MEETUP event.

The event organizer 10 alternatively may instruct the GATHER™ service provider 12 to create a new list. The new list may include a list(s) the GATHER™ service provider 12 already has associated with the event organizer 10, a respective subset(s) of those list(s), and/or email addresses that the event organizer 10 provides to the GATHER™ service provider 12 in connection with setting up the event named by the event organizer 10. The new list of email addresses as constructed by the event organizer 10 may be stored by the GATHER™ service provider 12 in association with information on the event organizer 10 so that the list may be used for other event(s) and/or otherwise.

Advantageously, the GATHER™ service allows an event organizer to specify one or more subsets of a list of invitees. Specifically, the specification of a subset of a list may be carried out by making use of a "list segmentation feature" such as offered by email marketing services such as MailChimp®. An example of a sub-set of a list may be a list of email addresses of persons who all live in the same city.

In the exemplary embodiment, no matter how the list of email addresses for an event is determined, the list for an event may be named after the event. Other embodiments of the inventions may name or title a list of email addresses for an event in other ways.

The GATHER™ service provider 12 associates the GATHER™ number selected by (or provided to) the event organizer 10 for the event with the list(s) of email addresses as selected and/or provided by the event organizer 10 for the event.

Defining the Date/Time of an Event

Besides the list of emails, the event organizer 10 may provide additional information related to the event he or she is setting up to be implemented by the GATHER™ service. The event organizer 10 may specify when the event is to begin and when it is to end. FIG. 3 shows a box 36 on the screen shot 20 of the device 30 where the event organizer 10 may specify the expiration or end date for the event named MAILCHIMP® MEETUP. In the exemplary embodiment, once an event organizer 10 specifies an end date in the creation of an event, the end date is fixed and cannot be changed. Other embodiments may allow the event organizer 10 to change the end date, but in those cases, the consent of the participants associated with the event may have to be obtained prior to implementing the change in the end date. An alternative embodiment of the inventions may allow an event organizer 10 to leave the "end" date blank so that the event runs for an indefinite period of time.

The examples provided herein only use a "date" and not a "time" on that date for the start and stop times of event. Thus, the start and stop times of an event occur when the dates changes, i.e. 12:00 am. Other embodiments may allow the event organizer 10 to select the times as well as the dates of the start and/or end of an event, and/or may allow the date change at a different other than 12:00 am.

Invitation to an Event

Figure 4:
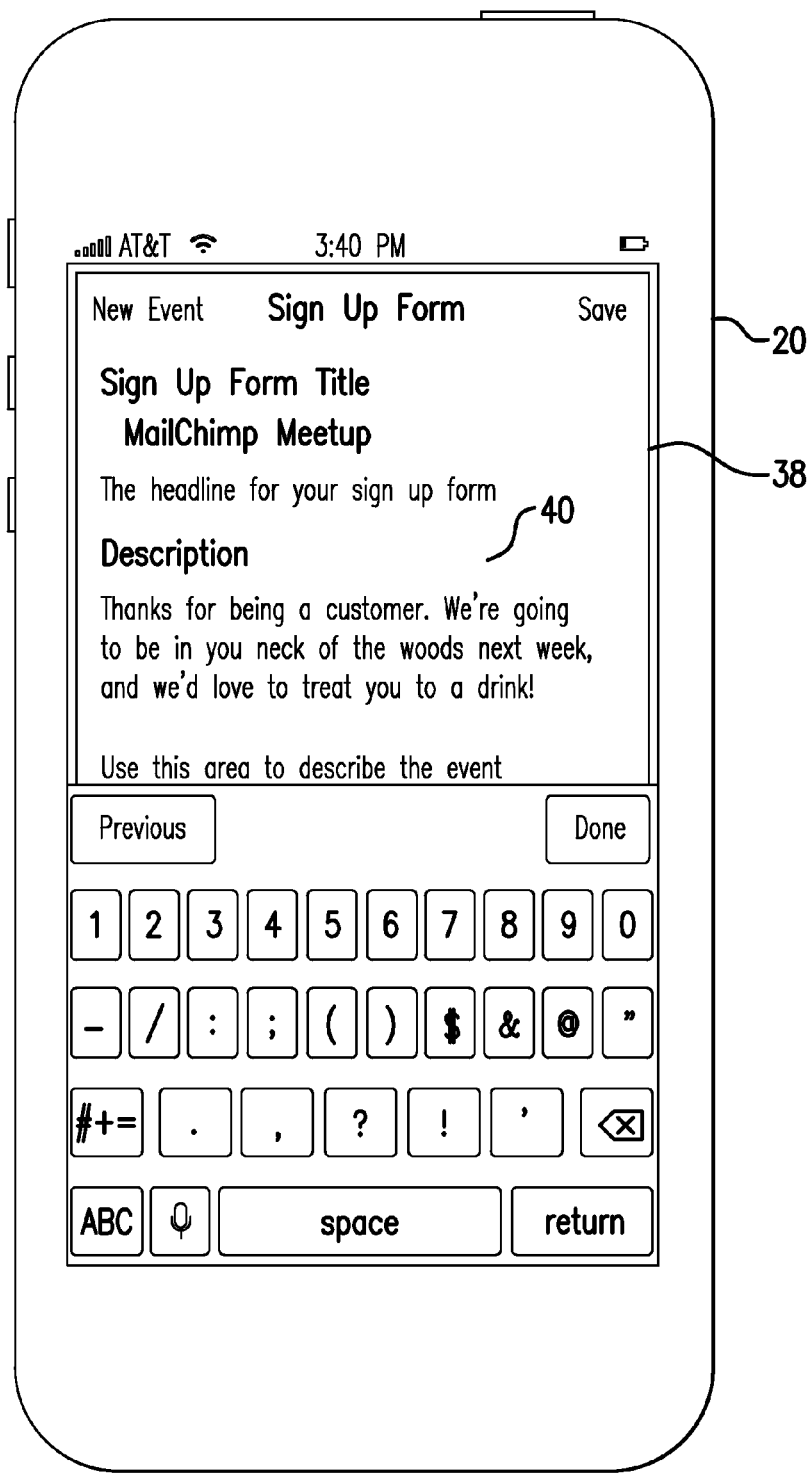

Besides the start/stop times of an event, the event organizer 10 may provide the information that may make up the invitation or initial email message to be sent by the GATHER™ service provider 12 to the group of invitees associated with the event. The substance may be text, graphics, or a combination thereof as may be accommodated by the respective devices of the organizer and invitees. FIG. 4 shows the device 20 with screen shot 38 in the GATHER™ app including a box labeled "Description" where the event organizer 10 may enter text including an invitation to the invitees to participate in the MAILCHIMP® MEETUP event.

Advantageously, an embodiment of the inventions allows an event organizer 10 to initiate invitations to his or her GATHER™ event in other ways besides the emails to an associated list of email addresses mentioned above. The event organizer 10 may be provided with or have the option of using a "short URL" as a way to invite people to the GATHER™ event and to have participants provide their text message numbers. URL shortening is a technique on the World Wide Web (Internet) in which a Uniform Resource Locator (URL) may be made substantially shorter in length and still direct to the required page. This may be achieved by using an HTTP Redirect on a domain name that is short, which links to the web page that has a long URL.

The event organizer 10 may share the short URL as part of an event invitation on social networks, and especially on event or occasion planning and/or ticket sale services such as Eventbrite™ or Brown Paper Tickets™. Invitees who are interested in participating in the event may click on the short URL in the invitation to reach a venue where he/she may supply his/her texting number to the GATHER™ service. The embodiments of the inventions such as the GATHER™ service interfacing with third party services may achieve connection through application programming interfaces (APIs) between and/or among the respective services.

Advantageously, the event organizer 10 may continue to cause invitations to be sent after the initial invitations have been sent out and/or even after the associated event has started. To do so, the event organizer 10 may provide the GATHER™ service provider 12 with the email addresses of the new invitees and/or may specify an email list previously provided to the service provider by the event organizer 10. In an alternate embodiment, after the initial invitations have been sent out, the event organizer 10 may invite invitees previously invited, but who have not responded with a text message number. The GATHER™ service provider 12 may send the additional invitations. As with the initial group of invitees, the event organizer 10 may be notified when a later invitee/s choose/s to become a participant/s.

Once the event has ended, in this embodiment, the event organizer 10 cannot continue to cause invitations to be sent relating to the event.

Referring to FIG. 1a again, in this example, the GATHER™ service provider 12 causes an invitation email to be sent as indicated by arrows 41a, 41b, 41c to each of the email addresses on the list 20. As shown in FIG. 1a, the invitees 44a, 44b, 44c respectively associated with the email addresses may review the email invitation on any appropriate device such as the illustrated mobile device 46, tablet computer 48, and/or desk top computer 49.

Example of an Invitation

Figure 5:
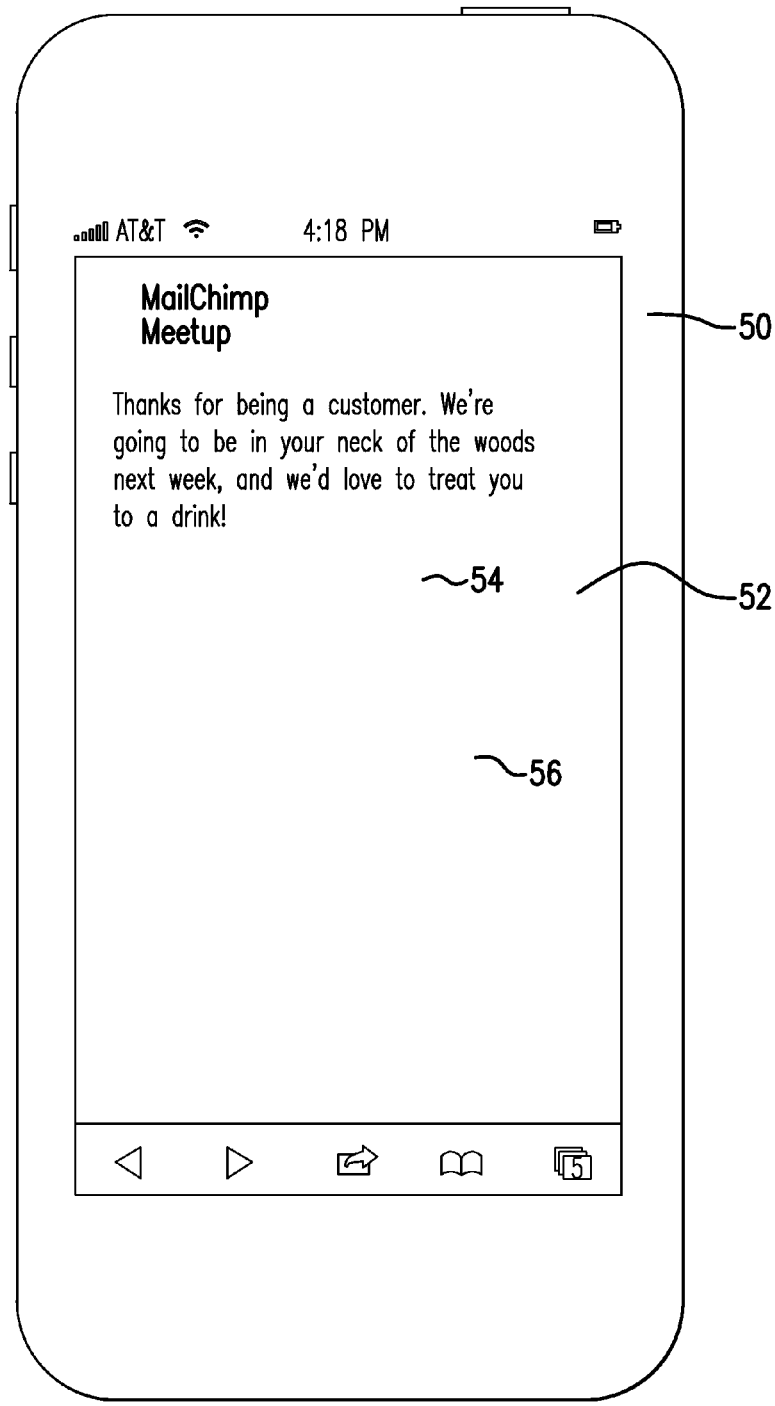

FIG. 5 shows what an invitee might see by way of an invitation. Mobile device 50 presents a screen shot 52 of an example of such an email invitation. It may include information about the GATHER™ service and the desire of the event organizer 10 to include the invitee among those receiving information about the event. The information provided to the invitee about the GATHER™ service may include various facts about the service. The facts may include an explanation that the GATHER™ service provider will not divulge the texting number of the invitee to any third party including the event organizer 10. The facts also may include an explanation that upon expiration of the event of the event organizer 10, the texting number of the invitee will be deleted from the records of the GATHER™ service provider 12 (with the exception noted below).

If the organizer 10 has enabled a public archive webpage for the event, the information about the webpage may be presented in the invitation. A participant may view all or some messages related to the event on the specified webpage by using his or her browser to locate the designated URL for the webpage.

In FIG. 5, the screen shot 52 also provides optional information in the text displayed 56 as to when the invitee's texting number is to be deleted from the records of the GATHER™ service provider 12 for that event. If the invitee participates in only one event associated with the event organizer 10, in the exemplary embodiment, the time specified for the deletion is also the end of that event as set up by the event organizer 10.

If the invitee participates (as a participant) in more than one event associated with the event organizer 10, in the exemplary embodiment, the invitee's texting number is deleted from the records of the GATHER™ service provider 12 only upon expiration of the latest or last event (in time) in which the invitee participates according to the exemplary embodiment. Further information on this feature of the exemplary embodiment is provided below. Other embodiments may vary with respect to this feature.

Response to the Invitation

To participate in the exemplary GATHER™ service for the event, the invitee may provide the GATHER™ service provider his/her texting number. In some embodiments of the inventions, an invitee may provide more than one texting number, in which case, text messages from the event organizer are provided to all of the texting number provided by an invitee. In other embodiments of the inventions, depending on implementations of the embodiments, an invitee may provide other type(s) of contact information for receipt of messages. The message(s) sent to the participant via the GATHER™ service are directed to the participant's texting number in this exemplary embodiment. In other embodiments, the message(s) may be sent via a communications medium appropriate to the contact information provided by the invitee.

The screen shot 52 on the device 50 in FIG. 5 includes a box 54 where the invitee may enter his or her texting number. By replying to the invitation email with his or her texting number, the participant has subscribed or "opted in" to the event created by the event organizer 10.

In contrast to the event organizer 10, an invitee does not have to download the GATHER™ service app to his or her device. Thus, an invitee does not have to have a "smart device".

As shown in FIG. 1b, the invitees 44a, 44b, 44c may reply to the GATHER™ service provider 12 and opt into the text messaging service or not. In this example, invitee 44a has decided not to join the event. In this embodiment, the invitee 44a does not have to communicate to decline. Invitee 44a may simply not respond to the invitation email. Without a texting number from the invitee 44a, the GATHER™ service provider 10 is unable to send a text message to the invitee 44a. The other invitees 44b, 44c may communicate their participation in the event by supplying their texting numbers in respective return emails, which are transmitted as indicated by arrows 58a, 58b to the GATHER™ service provider 12.

Responding Via Web Form

In another embodiment or as an alternative in the present embodiment, the invitation email may include a hyperlink to a web form, i.e. a form presented on a website by the GATHER™ service provider 12 for the GATHER™ service and that section or portion of the website related to the event of the event organizer 10. The invitees who choose to participate in the event may fill in text fields on the web form such as texting number, email address, full name, address, etc. The web form may provide information about the GATHER™ service such as the fact that the event organizer 10 and participants will be able to engage in a two-way communication via text messaging, but that the event organizer 10 will not have access to the participants' respective texting numbers. The web form also may point out that the participant's texting number will be deleted from the records of the service provider when the event ends (unless the participant participates in more than one event associated with the event organizer 10). The deletion of the texting number is also referred to herein as expiration of the texting number with respect to the GATHER™ service at least for that specific event.

Opting Out of an Event

A participant who has initially opted into the text messaging service for a particular event may "opt out" by sending a "stop" communication to the GATHER™ service provider 12. For example, the opting out participant may simply reply "stop" to a text message received about the event of the event organizer 10.

The GATHER™ service provider 12 may or may not provide the event organizer 10 with the information about the opt out of a participant.

If the particular event is the only event associated with the event organizer 10 in which the "opting out" participant is participating, the GATHER™ service provider 12 may remove the texting number of the opting out participant from its records at the time of opt out. The GATHER™ service provider 12 may remove the texting number even if the particular event has not ended. "Opting out" is synonymous with "unsubscribe" as used herein.

Even though the "opting out" participant's texting number is removed from the records of the service provider 12, the email address of the opting out participant remains in the list of emails associated with the event.

If the opting out participant participates in more than one event associated with the event organizer 10, in the exemplary embodiment, the GATHER™ service provider 12 may remove the participant from all events in which the participant participates relating to the event organizer 10. For example, if the opting out participant sends a STOP message relating to a particular event, the participant may be asked whether he/she desires to opt out of all events of the event organizer. Alternatively, the participant may opt out of all events of an event organizer by texting STOP ALL, or something similar to indicate the participant's desire to opt out of all events of the event organizer In an alternative embodiment, if the opting out participant participates in more than one event associated with the event organizer 10, the GATHER™ service provider 12 may remove the participant only from the event associated with the STOP message sent by the participant. In other words, the participant may be able to opt out of receiving messages about a particular event from an organizer, but continue to receive messages about one or more other events of that organizer For example, assume the GATHER™ service provider 12 receives a STOP message from a participant. In response, the GATHER™ service provider 12 may send a message to the participant with a numbered (and/or named) list or other identification of events in which the participant participates (in association with the event organizer 10 and/or otherwise). The participant then may specify which event(s) by number(s) and/or name(s) (and/or otherwise) the participant wants to opt-out of. As a follow-up, the GATHER™ service provider 12 then may remove the participant from the specified event(s), but not the other event(s).

By way of another example, assume a participant participates in two events created by the event organizer 10. One event is named MAILCHIMP® MEETUP and the other is named MAILCHIMP® AFTER DARK. The participant decides to opt-out or unsubscribe from the MAILCHIMP® AFTER DARK event. The participant may initiate this opt-out by texting the GATHER™ number of the event organizer 10 with the words "STOP". The GATHER™ service provider 12 sends the opting-out participant the names of the two events in which the participant has participated. The opting out participant expresses his or her desire to opt out of MAILCHIMP® AFTER DARK by making the appropriate response to the GATHER™ service provider 12. For example, the opting out participant may text "STOP MAILCHIMP® AFTER DARK".

Upon receipt of the opt-out text from the participant, the GATHER™ service provider, in this embodiment, removes the texting number of the participant from the list or other identification for MAILCHIMP® AFTER DARK event. The participant opting out of the MAILCHIMP® AFTER DARK event is not opting out of the MAILCHIMP® MEETUP event. The participant continues to be included in the MAILCHIMP® MEETUP event. The participant's texting number is not removed from the records of the GATHER™ service provider at the time of opt-out of the MAILCHIMP® AFTER DARK event. The participant's texting number is not removed because the participant continues to participate in an event sponsored by the event organizer 10.

As noted in the example in the previous paragraph, the GATHER™ service provider does not remove the texting number of the "opting out" participant from its records at the time of the opt out. Per this embodiment, for a participant who participates in more than one event associated with the event organizer 10, the service provider 12 removes the texting number of the "opting out" participant only when the participant has opted out of all events associated with the event organizer 10, or when the last event associated with the event organizer 10 in which the participant participates ends. Opting out or the end in time of the participant's last event with an event organizer 10 halts the conversation opportunities between the two. Of course, a participant who has unsubscribed (via expiry or choosing to unsubscribe) can sign up for a later event with the event organizer 10 (if offered and/or available) and reestablish communication.

Informing the Event Organizer about Response(s) to the Invitation

In alternate embodiments of the inventions, the event organizer 10 may receive information from the GATHER™ service provider 12 on response(s) to the email invitations. For example, the GATHER™ service provider 12 may send a push notification to the GATHER™ app of the event organizer 10 with the email address and/or other information relating to a participant each time an invitee agrees to participate. Alternatively, the GATHER™ service provider 12 may periodically send information about the response to the invitations to the event of the event organizer 10. In addition, or as yet another alternative, the GATHER™ service provider 12 may provide the event organizer 10 with information on the response to the event of the event organizer 10 within a predetermined or preselected (by the event organizer 10 or by the service provider 12) time in advance of the start of the event. The information may identify the email address of a participant, and/or the participant's name, and/or other information, if available. In an alternative embodiment, an event organizer may choose to receive information on participants or not, and may choose what kind of participant information to receive. In no case, however, is the event organizer 10 ever provided with a participant's texting number.

Participant Enrollment in an Event of an Event Organizer

Generally stated, upon receipt of texting numbers from respective participants 44b, 44c, the inventions keeps track of an event participant's texting number and email address in any appropriate manner so as to carry out the GATHER™ service. The exemplary embodiment associates the texting number of a participant and other data about the participant in association with the event organizer 10. If an event organizer has more than one event, the participant may be mapped to the event(s) in which he/she is participating in any appropriate manner such as by a many-to-many relationship to the event(s).

Storing Information about a Participant to Find the Participant's Communications with the Event Organizer after the Participant's Texting Number has been Deleted An advantage of the inventions is that a participant is assured that his/her texting number is stored only so long as needed to participate in event(s) of the event organizer 10. The inventions may be implemented in an embodiment that deletes a participant's texting number each time an event in which the participant participates ends. The exemplary embodiment differs. In the exemplary embodiment, as more fully described below, a participant's texting number is deleted from the records of the service provider 12 only when all of the events of an event organizer 10 in which a participant participates have ended.

Advantageously, as a result of storing a participant's texting number until all of the participant's events have ended, the exemplary embodiment is able to provide the event organizer 10 and the participant with communications from one or more prior events common to both the event organizer 10 and the participant. The communications may be organized for display in a conversational format or otherwise.

To provide the prior communications, the exemplary GATHER™ service goes through a process of storing information about a participant so that the participant's texting number may be deleted at the appropriate time, but the participant may be later identified so that the communication(s) between the participant and the event organizer may be identified and displayed in other later or concurrent event(s) of the event organizer 10 in which the participant participates. This process of storing information about a participant may be carried out by the exemplary embodiment when the participant agrees to participate in an event. Other embodiments may carry out the same or similar processes at other times prior to deletion of the participant's texting number from the GATHER™ service.

The following is a description of the process the exemplary embodiment of the invention may provide so that the GATHER™ service provider 12 may store information about a participant for future reference without the service provider 12 (or any other entity) storing the texting number of the participant after the last event of the event organizer in which the participant participates has expired. Other embodiments may carry out the process differently.

The process begins with the GATHER™ service provider's receipt of information from a participant signifying the participant's agreement to participate in an event of the event organizer 10. The GATHER™ service provider 12 may receive the participant's agreement in a reply email from the participant to the invitation email sent to the participant by the service provider 12 on behalf of the event organizer 10 inviting the participant to the invention. The information from the participant includes his/her email address and texting number.

Optional Preliminary Actions to Storage of a Participant's Information

Upon receipt of the participant's information, the GATHER™ service provider 12 may carry out some preliminary actions prior to the storage of the participant's information. For example, the GATHER™ service provider 12 may check whether the event in which the participant agrees to participate is the first GATHER™ event of the event organizer 10. If it is the first event of the event organizer 10, then the GATHER™ service provider 12 may conclude that the participant is a "new" participant. All participants of a first GATHER™ event of an event organizer are new participants. A "new" participant is a participant about which there is no information in storage in association with an event of an event organizer in the GATHER™ service. The service provider 12 may proceed with the storage process regarding a new participant's information as explained further below without first checking for a record of the participant associated with the event organizer as also explained below.

An alternative embodiment also allows for skipping the search or check for the record of the participant associated with the event organizer 10. In this alternative embodiment, the participant may provide information that he/she is a first time participant in a GATHER™ event of the event organizer 10.

Summary of the Storage Process

The storage process of a participant's information in association with an event organizer 10 is first summarized herein and then explained in further detail. As shorthand herein, the described process refers to storage of a participant's information "in association with an event organizer". Obviously, the participant's information is stored in association with "information" about the event organizer 10 not the actual person who is the event organizer 10. Similar shorthand may be used herein with respect to other people or entities and their respective information as will be understood by those skilled in the art.

In sum, when a participant agrees to participate in an event, the GATHER™ service provider 12 computes normalized values respectively for the wireless number and email address of the participant, hashes each of the normalized values, and checks for a match of either hash result. If a match is found of either hash result, the GATHER™ service provider 10 determines that the participant has participated previously or is participating in an event associated with the event organizer 10. In that case, in this embodiment, the GATHER™ service provider may be able to access past communications between the event organizer 10 and the participant. The GATHER™ service may provide those communications as conversational history between the event organizer 10 and the participant. If no match of either hash result for a participant is found, then the GATHER™ service determines the participant is "new" and that no conversational history exists between the event organizer 10 and participant. The GATHER™ service provider then creates a record for the participant and stores it in association with information about the event organizer 10.

Details of the Storage Process

More particularly, the GATHER™ service computes a normalized value for the participant's wireless number. The GATHER™ service also computes a normalized value for the participant's email address. A "normalized" value also may be referred to as a "least common denominator". For example, a wireless number may be "normalized" by stripping the spaces, if any, in the number, and stripping "non-numbers" such as dashes or periods that may separate the numbers. As another example, an email address may be "normalized" by setting all the letters to lower case, removing the "@" symbol or any other non-number or non-letter.

The service provider 12 carries out a one-way hash function with respect to the normalized value for the participant's email address. The service provider 12 stores the result, which is referred to herein as the "email address identifier". The one-way hashing of the email address also may be referred to more generally as the coding of the email address.

In addition, the service provider 12 carries out a one-way hash function with respect to the normalized value of the participant's texting number, and stores the result, which is referred to herein as "texting number identifier". The one-way hashing of the texting number also may be referred to more generally as the coding of the texting number.

For example, the service provider 12 may use MD5 (Message-Digest Algorithm) as a one-way hash function, but other one-way hash functions may be used. MD5 may be preferable because it does not take as long to compute, and the chance of collision is not high. Collision refers to the circumstance where two inputs may yield the same result in rare cases. The one-way hash function used to obtain the email identifier may be the same or be different from the one-way hash function used to obtain the texting number identifier.

In some embodiments of the invention, a different type of hashing that produces an irreversible output may be used rather than a one-way hash. For example, the service provider may use bycrypt instead of MD5. Bycrypt is a key derivation function for passwords based on blowfish encryption.

No matter how it is accomplished, the point is to create an undecipherable key derived from the wireless number and an undecipherable key derived from the email address of a participant. The two keys are stored. Together, they are referred to herein as the "record" of a participant. Besides the two keys, the record of a participant may contain other information or data (or not). Storing the two keys (or identifiers) of a participant allows the GATHER™ service provider 12 to later look up the participant (by using either of the two keys) without storing the wireless number of the participant.

Determining if a Participant is New or a Previous Participant

The exemplary GATHER™ service stores messages (also referred to herein as "communications") sent during an event between the event organizer 10 and a participant. The GATHER™ service stores these messages so that they may be later accessed if the participant participates in another event of the event organizer 10. The messages from former event(s) may be presented in a conversational form or history to the event organizer 10 and/or the participant. Thus, the exemplary embodiment of the GATHER™ service provides a way to determine whether a participant agreeing to participate in an event of an event organizer 10 is "new" to the events of the event organizer 10 or has previously participated in events of the event organizer 10.

The exemplary embodiment provides a process for determining if a participant is new or not by using the participant's information provided or associated with the agreement to participate in the (current) event of the event organizer. The information used in the process includes the email address and texting number of the participant. The email address and texting number, respectively, are hashed into an email address identifier and a texting number identifier. See description above. The identifiers are compared to previous identifiers stored by the GATHER™ service. If a match is found to one of the participant's identifiers, then the participant has previously participated in an event of the event organizer 10. A previous participant may have previous messages to/from the event organizer 10 stored by the GATHER™ service provider. These previous messages may be organized into conversations for presentation to the event organizer and/or the participant as part of the communications related to the current event.

An alternative embodiment of the invention may give the event organizer 10 and/or the participant an option of whether or not to view such prior communications and one or more options of the manner in which the prior communications may be viewed (chronologically, reverse chronologically, etc.).

An example is now presented to provide additional details regarding an exemplary process according to the invention for determining if a participant is new to events of the event organizer. In this example, the participant has provided his/her texting number to participate in a first event associated with the event provider 10. It is the only event in which the participant has ever participated. At the end of the first event, the GATHER™ service provider 12 deletes the participant's texting number from its records.

Later in time in this same example, the event organizer 10 includes the participant in an email list for invitation to a second event. The GATHER™ service provider 12 sends an email invitation to the second event to the participant. The participant agrees to participate in the second event and provides his/her texting number. The GATHER™ service provider 12 runs the participant's email address and his/her texting number through the hashing process described above to find the two keys or identifiers of the participant.

The GATHER™ service looks for a match to either of the two keys of the participant. If a match is found to either texting number identifier or email address identifier, the GATHER™ service provider 12 determines that the participant has previously participated in an event(s) associated with the event organizer 10. By finding either matching identifier, the GATHER™ service provider 12 is able to access past communications between the event organizer 10 and the participant. The GATHER™ service provider 12 then may provide the past communications in the form of a conversation (and/or otherwise) such as a conversational history to the event organizer 10 and/or participant as part of the historic conversation between the event organizer 10 and participant.

Other embodiments of the invention may require that both identifiers match before providing past communications to the event organizer 10 and/or participant.

Only One Matching Identifier

In the exemplary embodiment, the GATHER™ service provider 12 may find that one of the identifiers of a participant yields a match, but not the other. In that case, the GATHER™ service provider 12 uses the matching identifier to find previous communications between the participant and the event organization 10 (if any). The non-matching identifier may be ignored.

Alternatively, the GATHER™ service provider 12 may change the non-matching identifier to match the new information. For example, assume the participant's email address remains the same, but the texting number of the participant has changed. The email address identifier for the participant is found, but the texting identifier does not match. In that case, the email identifier is used to find previous communications (if any). The texting identifier is changed so that it corresponds to the new texting number.

No Matching Identifiers

If the GATHER™ service does not find a match to either the email identifier or the texting identifier, then the GATHER™ service determines that the participant has not participated in a previous event associated with the event organizer 10. No communications between the event organizer 10 and participant are available for inclusion in future conversation displayed to either/both the event organizer 10 and participant in this embodiment of the GATHER™ service. Other embodiments may differ.

GATHER™ Service Stores Identifiers and Communications Between Event Organizer and Participants, but Deletes Participants' Texting Numbers The GATHER™ service stores the email identifier and the texting number identifier for the participant in association with an event organizer 10. The email identifier and the texting number of a participant are also referred to herein as the "record" of a participant. Any communications between the event organizer 10 and participant may be associated with the participant's record.

After the event ends, the GATHER™ service deletes the participant's texting number from the GATHER™ service provider's records (if it is the last event of the event organizer in which the participant is participating). The GATHER™ service continues to store the participant's record including the identifiers and the association with the communications between the event organizer and the participant. If a participant agrees to participate in a subsequent event of the event organizer, the participant's previous communications (if any) with the event organizer may be found using the participant's record, and the communications may be included in a displayed conversation between the event organizer and the participant during the new event as described above.

GATHER™ Service May Alert Event Organizer of Invitee's Agreement to Participate in an Event As the invitees agree to participate in the event, the GATHER™ service provider 12 may provide the event organizer 10 with information on the invitees who have agreed to participate in the texting service during the event. Alternatively, the GATHER™ service provider 12 may provide the event organizer 10 with the information about participants at some designated time or otherwise so that the event organizer 10 is not bombarded with many messages regarding the individual participation of invitees. The information provided to the event originator 10 may include the participants' email addresses. The information does not include the texting numbers of the participants.

GATHER™ Service May Send a Welcome Message

When a participant subscribes to an event, the GATHER™ service provider 12 may send the participant a welcome message. The event organizer 10 may author the welcome message in whole or in part or not at all. The GATHER™ service provider 12 may provide the event organizer 10 with the welcome message (in whole or part) or not. The welcome message is sent as a text message to the participant in this embodiment. Other embodiments may provide alternative or duplicative messages sent as other forms of communication such as email. If the welcome message is sent via text message, it will appear to the participant as being received from the texting number selected by or provided to the event organizer 10 for the event. If the event organizer 10 has enabled a public archive webpage to display the list of messages (all or some) regarding the event, the welcome message may provide the URL for the webpage.

Messaging from the Event Organizer to Participant(s)

Beginning at the start time of the event and continuing through its duration, (or longer if a participant participates in another of an organizer's events that ends later), the event organizer 10 may use the GATHER™ service to start the process that ultimately may result in a text message being sent to one or more participants in the event. The event organizer 10 may use the app for the GATHER™ service on the event organizer's device to create and/or send the message. The GATHER™ app may present the event organizer 10 with a template for creating all or part of the message. The template may contain boxes, also referred to as windows, which the event organizer 10 fills with designated information to complete the message. In the exemplary embodiment, the event organizer 10 may cause a text message to be sent at about the same time to all of the participants in an event. In some embodiments, the event organizer 10 may be able to send a text message to a particular participant rather than all the participants. For example, the event organizer 10 may be able to respond to a participant's message to the event organizer 10.

Event Organizer Identifies the Event for the Message

In the exemplary embodiment, the event organizer 10 identifies the event for the message by name of the event. The exemplary GATHER™ service may present an event organizer with a list of all of the events the event organizer has set up. In that case, the event organizer chooses the event for the message. In some circumstances, the event organizer 10 may choose all or more than one of the events for the message. Alternatively, the event organizer may have to supply the name of the event(s) in an appropriate box on the template or otherwise. The GATHER™ service provider 12 uses the name of the event(s) to determine the participants to receive the message.

In the exemplary embodiment, the event organizer 10 identifies only a single event for the message. Other embodiments may allow the event organizer 10 to identify one or more of his/her events. In other words, the event organizer 10 may send the same message using the GATHER™ service to participants in one or more groups of his or hers.

Event Organizer Identifies all Participants, a Sub-Set(s), or a Single Participant to Receive the Message Advantageously, the exemplary embodiment of the GATHER™ service allows the event organizer 10 to send his/her message to all participants of an event, a sub-set of thereof, or a single participant of the event. When the event organizer 10 is preparing his/her message, the GATHER™ service may present the event organizer 10 with options of sending the message to all participants, a saved sub-set(s) or segment of participants, a new sub-set of the participants, or a single participant.

To send the message to all participants, the event organizer 10 checks the "send to all participants" option.

To send to a sub-set(s) of participants, the event organizer 10 checks the "send to a sub-set" option. If there is more than one sub-set, the GATHER™ service may present a list of the sub-sets. The sub-sets may be identified by their identifying characteristic (same zip code, same first name, etc.). The event organizer 10 may check the sub-set(s) to which his/her message is to be sent.

To send to a new sub-set of participants, the event organizer 10 may check the "send to new sub-set" option. The event organizer 10 may be able to supply one or more criteria for including a participant in a new sub-set. The GATHER™ service creates the new sub-set from the list of email addresses for invitees using the criteria supplied by the event organizer. The event organizer 10 then may choose the new sub-set to which his/her message is to be sent.

More particularly, the specification of a subset of participants may be carried out by making use of a "list segmentation feature" such as offered by email marketing services such as the MailChimp® service.

To send to only a single participant, the event organizer 10 may make a sub-set of participants with only a single participant. The event organizer 10 simply chooses the sub-set with the single participant or creates a new sub-set with only the participant included. Alternatively, the GATHER™ service may present the event organizer 10 with the list of participants (by name, email address, and/or other information), and the event organizer 10 may choose one or more participants to whom the message is to be sent.

Other embodiments of the inventions may allow an event organizer 10 to send a message only to all the participants.

Event Organizer May Create His/Her Message

The GATHER™ app may allow the event organizer 10 to create the "substance" of each message. The "substance" of a message is defined herein to mean the actual information the event organizer 10 desires to convey to participants rather than other data that may be included in the text message such as the GATHER™ number of the event organizer 10, the name of the event, etc.

The event organizer 10 may type, copy and/or otherwise submit the substance of the message in the appropriate box of the template provided by the GATHER App™ for the message. Other embodiments may provide other ways for an event organizer to compose a message.

The length of the substance of a message depends on the format used for transmitting the message. In the exemplary embodiment, SMS is used. SMS messaging uses 140 bytes (octets) per message, which translates to 160 characters (6 bit bytes) of the English alphabet using 7-bit encoding. Thus, the substance of a message may use up to 160 characters.

During a particular event, theoretically, the event organizer 10 may send an indefinite number of messages to the GATHER™ service provider 12 for transmission in text messages to participants. It is more likely, however, that the event organizer 10 is allowed a selected number of messages during the time of the event such as based upon a payment plan selected by the event organizer 10. Also, the length in time of the event is a factor in determining how many text messages may be sent. No text messages for an event may be sent after the event has ended.

If the event organizer has enabled a public archive webpage for listing the messages related to the event, the event organizer may include the URL for the webpage so that participants may easily access the webpage.

Transmission of the Event Organizer's Message to GATHER™ Service Provider

Whether the event organizer's message is for all participants, a sub-set of participants, or a single participant, the exemplary GATHER™ app causes the message to be transmitted from the event examiner's device using HTTP to the GATHER™ service provider 12. Other embodiments may vary.

FIG. 1c illustrates the sequence in communication of a message from the event organizer 10 to the GATHER™ service provider 12. The event organizer 10 uses the GATHER™ app on his or her device to send (as indicated by arrow 64a) a message to the GATHER™ service provider 12 (as indicated by arrow 64b) for relay as a text message to the participants 44b, 44c in the event.

Actions Related to Receipt of the Message by the GATHER™ Service Provider

Upon receipt of the event organizer's message, the GATHER™ service provider 12 recognizes the event organizer 10. In the exemplary embodiment, the GATHER™ service provider 12 recognizes the event organizer 10 by a token assigned to the GATHER™ account of the event organizer 10. For example, the token may be an application programming interface (API) key for the event organizer 10 associated with the GATHER™ service provided by the GATHER™ service provider 12. The service provider 12 may recognize the event organizer 10 by other methods in other embodiments.

Upon receipt of the event organizer's message, the service provider 12 may have to determine to which event, if the event organizer 10 has set up more than one event, the message received from the event organizer 10 pertains. The GATHER™ service provider 12 may determine the pertinent event from the name of the event provided by the event provider 10 in or associated with his/her message. Alternatively, the GATHER™ service may present the event organizer 10 with a list of his/her events and request the event organizer 10 to identify the event(s) to which the organizer's message pertains.

After determining to which event of the event organizer 10 the message pertains, the GATHER™ service provider 12 may check whether the timing is right for the event organizer's event. As noted above, when an event organizer 10 creates an event, the event organizer 10 specifies a start time and a stop time for the event. If the timing is right, the service provider 12 causes a text message as indicated by arrow 68a in FIG. 1c to be sent to the respective texting numbers of the participants 44b, 44c (as indicated by arrows 68b, 68c).

If the event organizer 10 has specified that the message be sent to participants of more than one event, then the GATHER™ service may have to carry out the actions described herein with respect to each event. Hereafter, the description refers only to a single event, but the reader will understand that more than one event may be involved.

If the event has not started yet, the GATHER service provider 12 may reply to the event organizer's message with information that the event has not started yet, but that the message will be transmitted when the event starts. The event organizer 10 may have the option of cancelling the message. The service provider 12 may otherwise provide the event organizer 10 with the information that the event has not started yet.

If the event has ended, the GATHER service provider 12 may reply to the event organizer's message with information that the event has ended. The reply may include information that the event organizer's message will not be transmitted to the participants. The service provider 12 may otherwise provide the event organizer 10 with the information that the event has ended.

GATHER™ Service Provider Causes the Message to be Sent to Participants

As noted above, if the timing is right, the service provider 12 causes a text message as indicated by arrow 68a in FIG. 1c to be sent to the respective texting numbers of the participants 44b, 44c (as indicated by arrows 68b, 68c).

In the exemplary embodiment, the GATHER™ service provider 12 uses an SMS (short messaging (or message) service) provider to send and receive the text messages to and from the participants. SMS is further described in Wells et al., U.S. Pat. No. 6,125,281 and in patent documents cited therein, all of which are incorporated herein by reference. SMS also may be referred to herein as instant messaging or text messaging. SMS is used herein to include mobile instant messaging (MIM) technology and may include multimedia messaging service (MMS) technology. In other embodiments, the GATHER™ service provider 12 may send (and receive) the text messages as a text messaging service provider without the need for a third party SMS provider.

Specifically in the exemplary embodiment of the inventions, the GATHER™ service provider 12 provides the information for the text message (from the event organizer 10 to participants) to the SMS provider via HTTP. In one embodiment, the GATHER™ service provider 12 provides the SMS provider with the following information via HTPP: the event organizer's GATHER™ number for use as the "from" number for the text message, the event organizer's substance for the message, and the texting numbers of the participants. Other embodiments may vary.

Upon receipt of the information from the GATHER™ service provider 12, the SMS provider sends the text message to the respective participants. The text message is sent so that the respective participants receive the event organizer's message as if the text message originated with the GATHER™ number of the event organizer 10.

Actions of Participant(s) Upon Receipt of a Text Message from the Event Organizer Once the SMS provider has sent the text message to a participant, the participant via his/her texting app on his/her device may access the text message. The event organizer's text message appears just like any other text message in the participant's texting app. In another embodiment, the event organizer's text message may be made to stand out from other text messages in some manner such as the use of an icon representing the event organizer and/or otherwise.

FIG. 1c shows that participant 44b receives his or her text message on the same device 48 (tablet computer) the participant 44b used to read and respond to the email invitation to participate in the event. Participant 44c, on the other hand, receives his or her text message on a different device 72 (a mobile device) than the participant 44b used to read and respond to the email invitation.

The GATHER™ service provider 12 may or may not communicate with the event organizer 10 to confirm that the text message was sent to the participants 44b, 44c.

Figure 6:
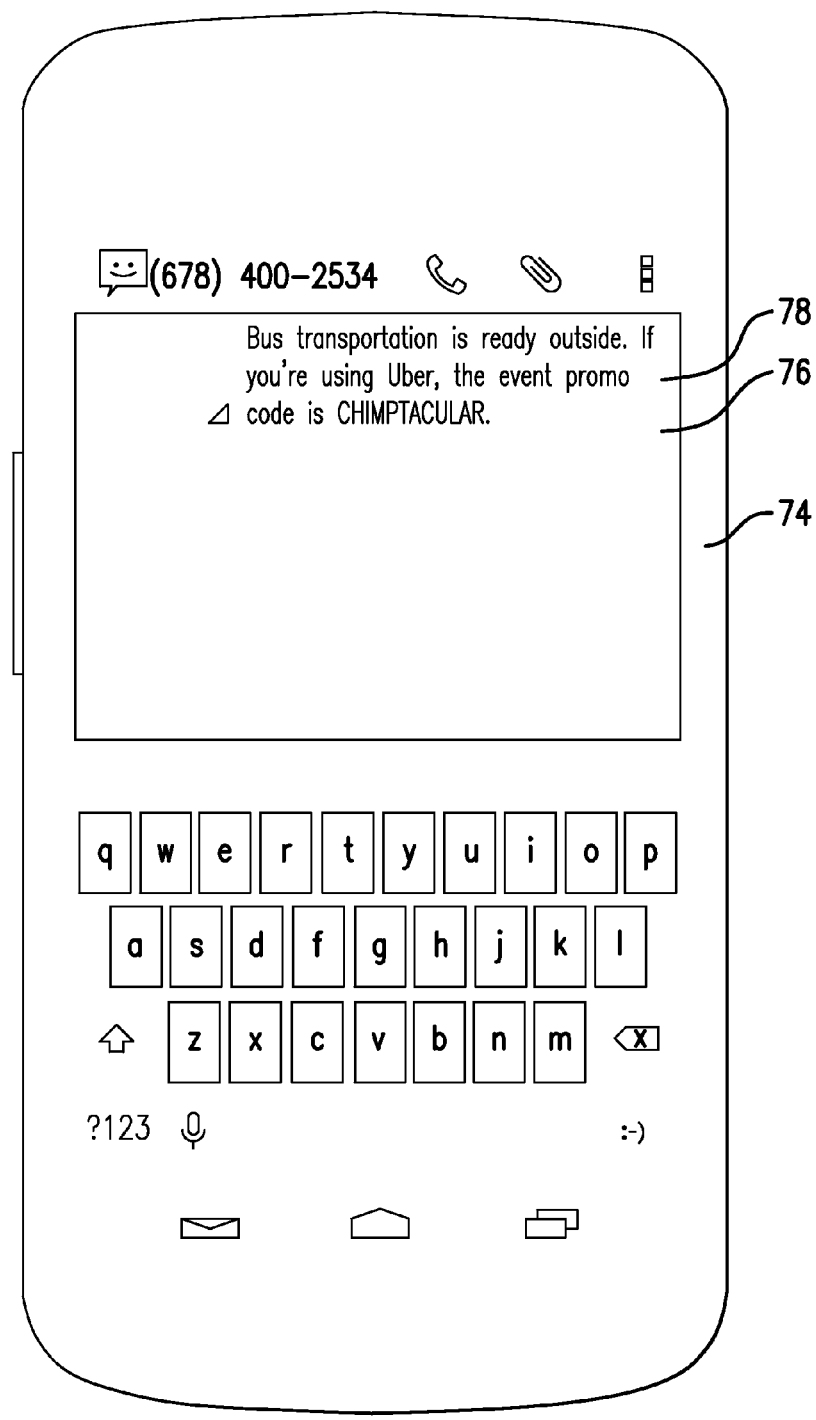

FIG. 6 illustrates a mobile device 74 showing a screen shot 76 that includes an exemplary text message 78 such as a participant may receive. The text message 78 appears to the participant as being received from the number selected by or provided to the event organizer 10, i.e., the GATHER™ number.

The exemplary embodiment allows the participants to reply to the event organizer 10 via text messages as if the participants were responding to a non-GATHER™ text message. A participant may respond to or otherwise communicate with the event organizer 10 by sending a text message to the GATHER™ number 24 of the event organizer 10. In one embodiment, the SMS provider receives the text message from the participant. The SMS provider parses the text message and sends it via HTTP to the GATHER™ service provider 12. Of course, if the GATHER™ service provider 12 is providing the functionality of the SMS provider in an embodiment, the GATHER™ service provider 12 receives the participant's text message without the need of an SMS provider as a "middle man".

In an alternative embodiment, a participant may reply via email with a message for the event organizer 10. The participant may send the reply email to the same email address to which the participant sent his/her response to the email invitation to participate as a participant in the event.

Actions of GATHER™ Service Provider on Receipt of Response from Participant

Upon receipt of the participant's reply, the GATHER™ service provider 12 may use the GATHER™ number 24 associated with the responsive text message to determine to which event organizer 10 the participant's message pertains. The responsive text message may include the name of the event so that the GATHER™ service provider 12 may determine to which event of an event organizer 10 (if the event organizer has more than one event) the responsive text message pertains. The responsive text message includes the texting number of the participant so that the GATHER™ service may recognize the participant. In transmitting the participant's message to the event organizer, the GATHER™ service does not provide the event organizer with the participant's texting number. Similarly, if the GATHER™ service embodiment allows for replies from participants via email, the GATHER™ service recognizes the participant by his/her email address.

The GATHER™ service provider 12 may check to see if the received message from a participant contains the word "STOP" to indicate an unsubscription or "opt-out" request. If a participant responds to a text message with an opt-out request, the GATHER™ service provider 12 may remove the opting-out participant's texting number from its records, if the participant participates in only the one event of the event organizer 10. No further text messages from the event organizer 10 for the event are transmitted to the participant.

If the participant indicates that he/she wishes to opt-out of all of the events of the event organizer 10, then the GATHER™ service provider 12 removes the opting-out participant's texting number from its records.

If the participant indicates that he/she wishes to opt-out of more than of the events of the event organizer 10, but not all of the events of the event organizer 10, then the GATHER™ service provider does not remove the opting-out participant's texting number from its records at least until the last event in which the participant participates ends or the participant opts out of the remaining event(s) of the event organizer.

If there is no "opt-out" request in the responsive text message from the participant to the event organizer 10, the GATHER™ service provider 12 may parse and relay the responsive text message as a communication via HTTP to the event organizer 10. The service provider 12 may include the name of the replying participant and/or other information relating to the participant in the communication sent to the event organizer 10. The GATHER™ service provider 12 does not provide the texting number of the participant to the event originator 10.

In the exemplary GATHER™ service, a participant may initiate a text message to the event organizer 10 rather than just simply replying to a message from the event organizer 10. In that case, the GATHER™ service provider 12 also may include the name of the participant (and/or other information)

to the event organizer 10. In no case, however, does the GATHER™ service provider 12 provide the event organizer with the texting number of the participant.

In the exemplary GATHER™ embodiment, the GATHER™ service provider 12 sends a push notification to the device of the event organizer 10 to inform him/her that a communication with a responsive message has been sent to him/her. The GATHER™ app on the device of the event organizer 10 may notify him/her of the receipt of a new message or communication. Such notification may be provided without the need for the event organizer 10 to open the GATHER™ app on his/her device. For example, the GATHER™ app on the device of the event organizer 10 may display a badge with a number within the badge indicating the number of messages received (but unread) related to the GATHER™ account of the event organizer 10.

To view the responsive message from a participant, the event organizer 10 may use his/her GATHER™ app on his or her mobile device and/or any other appropriate device. The GATHER™ service provider 12 may provide or make available the communications including the respective replies from participants to the event organizer 10 in any of a myriad of communication forms. As noted, if the author 10 is using the GATHER™ app and has allowed "push notifications" on his or her communications device, then the service provider 12 may send the event organizer 10 a push notification to inform him or her of the receipt of a communication relating to the event organizer's event. The event organizer 10 may use the GATHER™ app to view the communication.

As another example, the event organizer 10 may provide the GATHER™ service provider 12 with a texting number to use to forward the substance of the communications from the participants. Alternatively (or in addition), the service provider 12 may provide the substance of the communications from the participants to the event organizer 10 in another form such as email(s). No matter the form of the communication to the event organizer 10, the transmitted substance does not disclose the texting number of the participant to the event organizer 10.

As noted with respect to the exemplary embodiment, a participant, however, may do more than simply reply to a text message from the event organizer 10. During an event, a participant may initiate a conversation with the event organizer 10 by sending a text message to the GATHER™ number selected by or provided to the event organizer 10. A message in a conversation initiated by a participant is treated in the same manner as the participants' "reply" messages described above.

Advantageously, the exemplary embodiment of the GATHER™ service allows an event organizer 10 and a participant(s) to exchange messages during the whole time of the event. The exemplary GATHER™ service does not limit an event organizer 10 or a participant to only a single message exchange. The limiting factor for an event organizer 10 (besides the duration of the event) is likely to be the number of messages the event organizer's GATHER™ service allows based on the agreed payment plan.

Figure 7:
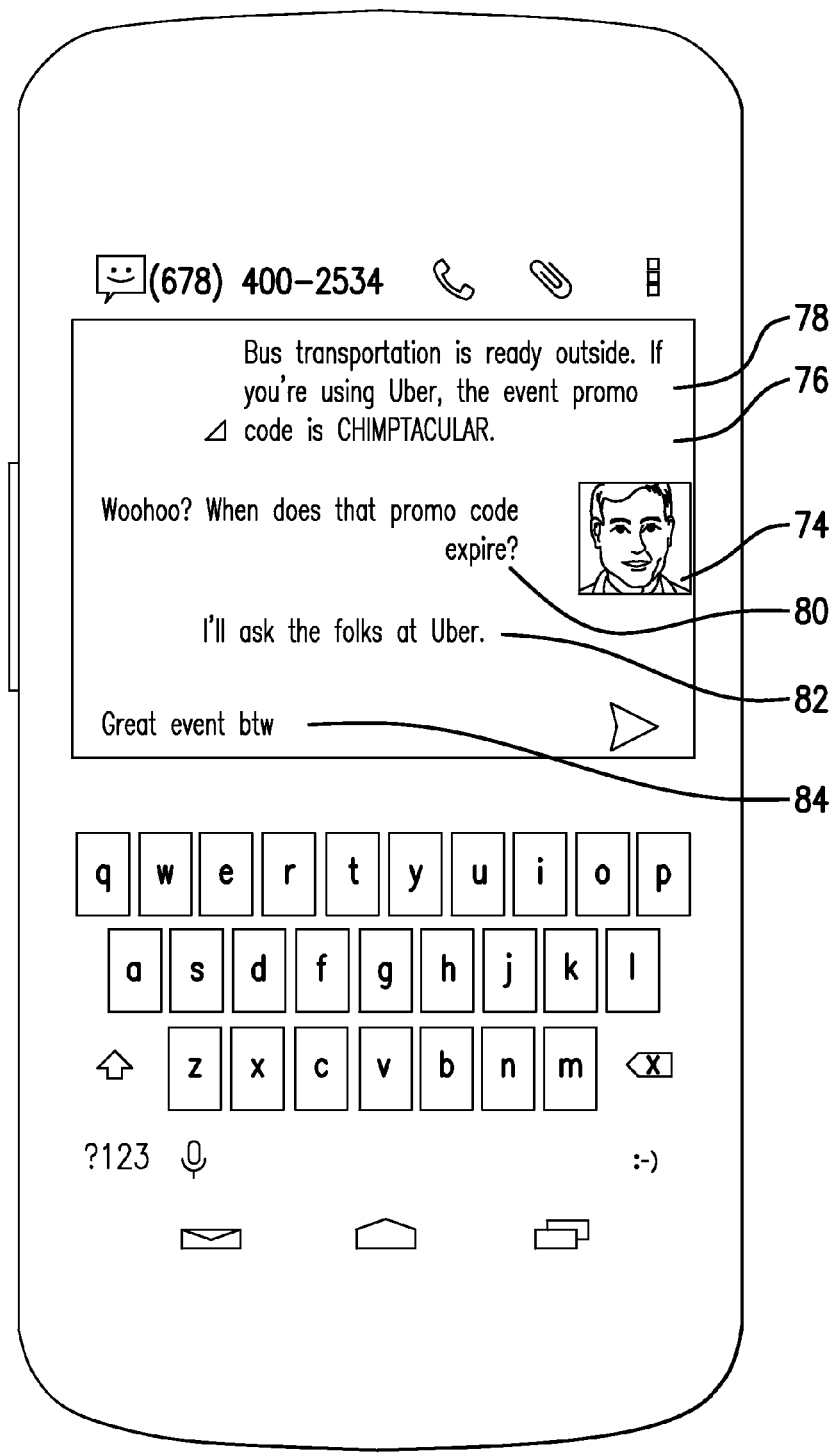

FIG. 7 illustrates a mobile device 74 showing a screen shot 76 that includes the exemplary text message 78 presented above in connection with FIG. 6. In addition, FIG. 7 illustrates an exchange of messages between an event organizer 10 and a participant. The event organizer 10 sent the message 78 to all of the participants associated with the event organizer's event. In the example, a particular participant has replied to the event organizer 10 with a question 80. The event organizer 10 responds in message 82. The participant again replies to the event organizer 10 with a message 84. Such message exchanges between an event organizer 10 and participant(s) may continue through the duration of the event or so long as the event organizer's payment plan for the service allows such communication. If a participant participates in another later ending event of the event organizer 10, the message exchange may continue beyond the end of the first event until the last event ends.

In the exemplary GATHER™ embodiment, it would not be unusual for a lot of participants to send respective text messages to the event organizer 10 at the same approximate time. For example, in response to the event organizer's invitation, a lot of participants may reply about the same time. Advantageously, the exemplary GATHER™ service allows for this circumstance. The exemplary GATHER™ service may group the messages so that the event organizer 10 is involved in respective separate conversations with the responding participants. The grouping of the messages into respective conversations for the event organizer 10 may be referred to as "multi-plexing". This process may be referred to as multiplexing because many participants may reply at about the same given time to a single message from the event organizer. Basically, the multiplexing may be considered to be message routing based on source destination wireless numbers. The grouping of messages may include email messages if the GATHER™ embodiment allows for replies from participants via email.

Further, the service provider 12 may use the name of the participant to organize the communication containing the substance of the participant's text message. If the text message from the participant is the first received from him or her, then the service provider 12 may organize the communication containing the substance of the text message as the beginning of a conversation between the participant and the event organizer 10, or as the first reply of that participant if the event organizer previously sent a text message such as an announcement message when the event started. If the text message from the participant is other than a first message, then the GATHER™ service provider 12 may organize the communication containing the substance of the text message as part of an existing or previous conversation between the participant and the event organizer 10. When an event organizer 10 checks for messages, the event organizer 10 may see a list of conversations that show the latest message from each participant.

Advantageously, the GATHER™ service may allow the event organizer 10 to choose to view messages from participants in a conversational style with the newest message first, or the event organizer 10 may choose to view messages from participants in chronological order (newest first) without organization into conversations. Moreover, in an embodiment of the inventions, messages from certain participants may be given priority and/or be provided more prominently or first over other participants' messages.

Alternative Embodiments May be One-Way Service

An alternative embodiment of the GATHER™ service may be a one-way service. For example, the event organizer 10 may send the substance of messages to the service provider 12 for transmission to the participants via text messages, but the event organizer 10 may not be able to receive information back from the participants. In other words, participants may not be able to reply to the event organizer 10.

Warning(s) and Notice about the End of an Event

Advantageously, the GATHER™ service may warn the event organizer 10 and/or the participants 44b, 44c that the end of the specified interval of time for the event approaches. The event organizer 10 and/or the participants may take the opportunity provided by the warning to send a final communication such as a thank you, good bye, and/or notice of future events.

At the end of the event organizer's event, the GATHER™ service provider 12 may inform just the event organizer 10, or the event organizer and the participants (or a subset of the participants as selected by the event organizer or otherwise) that the event has expired and that the texting notification service has been halted. The GATHER™ service provider's information may include notice that the texting numbers and/or email addresses of the participants are to be deleted upon expiration of the event.

Texting Numbers are Deleted at the End of an Event

At the end of the event, the GATHER™ service provider 12 removes the respective texting numbers of the participants from the service provider's system. The exception as mentioned previously is if the participant participates in another later ending event of the event organizer. The removal of a participant's texting number may be accomplished in any appropriate manner. In an exemplary embodiment of the inventions, the GATHER™ service provider 112 uses an SQL statement to set a value to null.

An embodiment of the GATHER™ service informs the participant(s) in a last text message of the deletion of their respective texting numbers after transmission of the last text message. Other embodiments may provide this information in other manners or not at all.

Advantageously, the GATHER™ service provider retains the information on the texting numbers and/or email addresses of the participants in a manner such that the service provider 12 does not store and cannot determine the texting numbers and/or email addresses. The hashing process described above allows the GATHER™ service provider 12 to look up participants in the future without having maintained the texting numbers of the respective participants.

After the end of an event with an event organizer 10, a participant may elect to participate in another event. The participant again provides the GATHER™ service provider 12 with his/her texting number. As explained above, the GATHER™ service provider 12 may create respectively the identifiers for the texting number and email address in the same manner as created for the event organizer's first event. The GATHER™ service provider 12 then may check to determine whether the newly created identifiers match any previously created identifiers for previous events set up by the event organizer 10.

If the newly created identifiers match the previously created identifiers, the GATHER™ service provider 12 may organize the text messages exchanged between the event organizer 10 and participant in the new event in a new conversation. The new conversation may include the previous conversation(s) between the event organizer 10 and the participant in the earlier event(s). By this feature of the exemplary embodiment of the GATHER™ service, the event organizer 10 and the participant have access to communications exchanged between them during the current event and previous event(s). An alternative embodiment of the inventions may allow an event organizer 10 to determine whether conversations from previous event(s) are to be included with the new conversation. The event organizer 10 and/or the participant may be provided with the option of viewing previous conversation(s). For example, a participant may choose to view the conversation from previous event A with the new conversation, but not the conversation from previous event B.

Flow Diagram

Figure 8A:
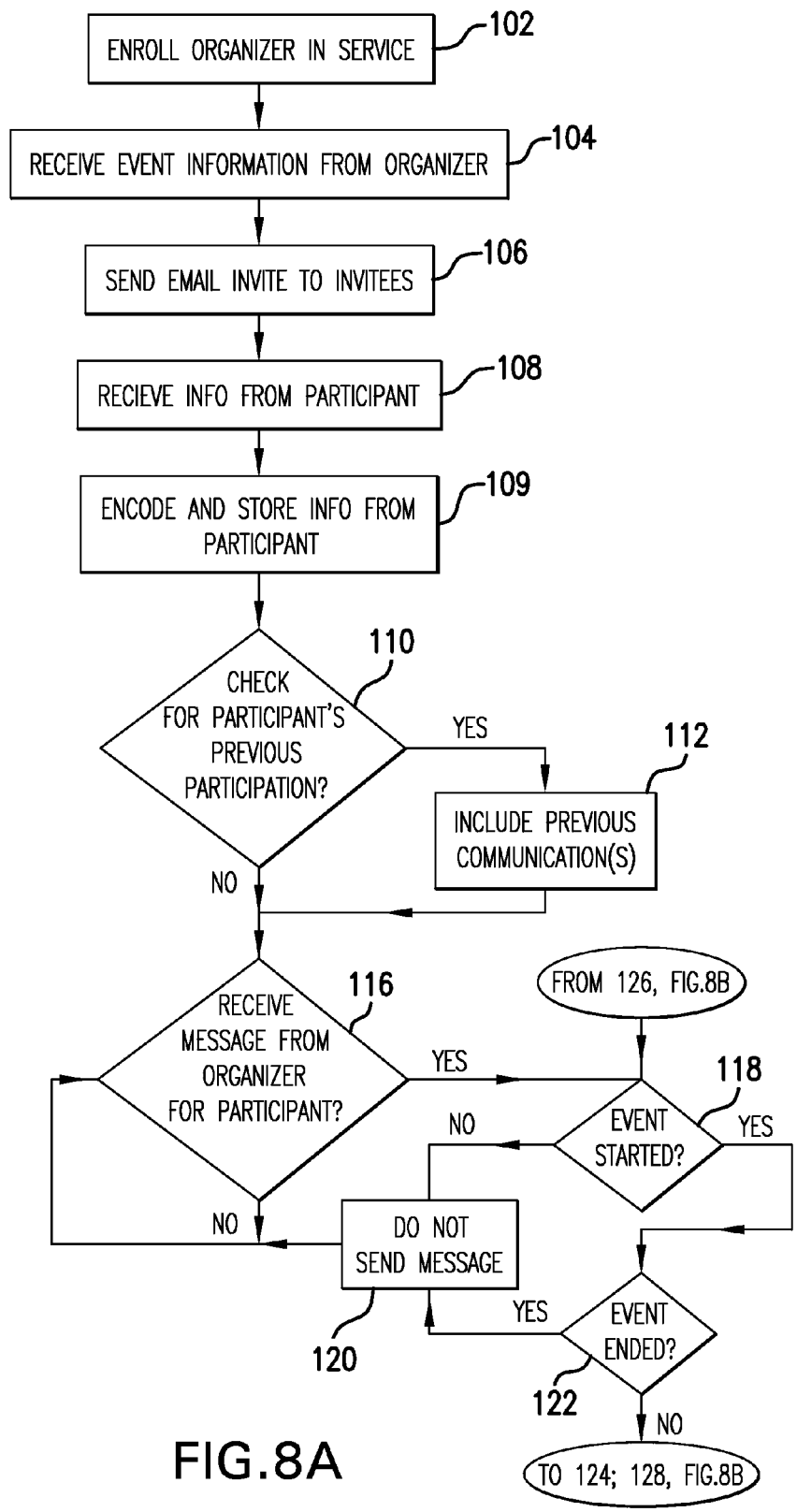
FIG. 8a-8b is a flow diagram illustrating an exemplary embodiment of the inventions.
Figure 8B:
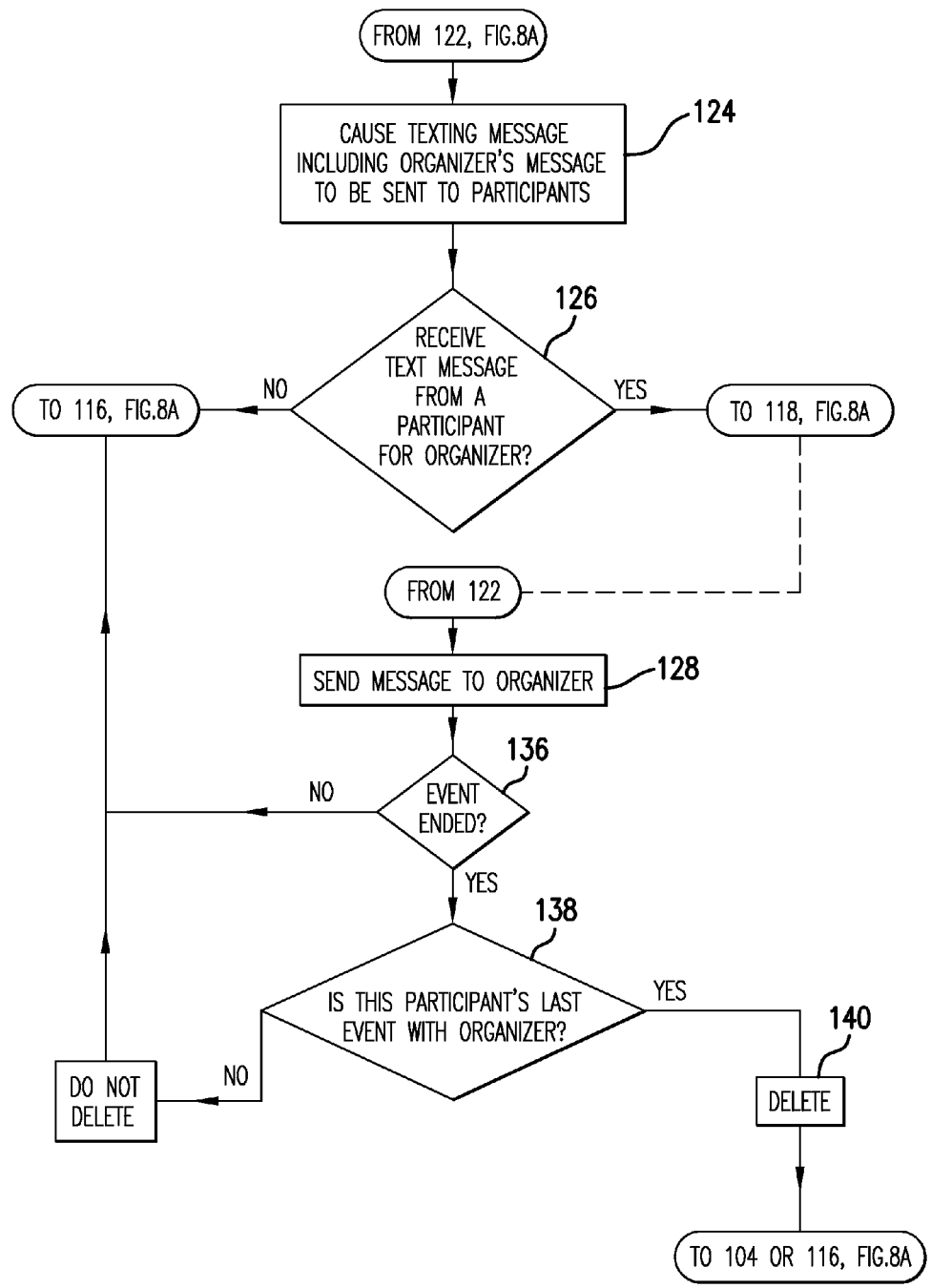

FIG. 8a-8b constitutes a flow diagram of actions of an exemplary embodiment of the inventions. The flow diagram begins with action 102 with the service provider enrolling an event organizer in the GATHER™ service. As part of the enrollment, the service provider may assign or allow the organizer to choose a number representing the wireless number of the event organizer Once enrolled, the service provider may receive event information from the event organizer to set up an event as shown in action 104. From the event organizer, the service provider may receive the name of the event, the start time and the end time for the event, and an electronic mail (email) address for at least one invitee to the event.

In action 106, the service provider sends an email invitation to the invitee(s) to the event. In action 108, the service provider receives a texting number(s) from respective invitee(s) who choose to be participant(s) in the event.

Upon receipt of a texting number from an invitee who chooses to be a participant in the event, the service provider encodes at least the texting number of the participant into a texting identifier. The texting number and the texting number of the participant may be stored in association with each other (or not). In addition to the texting number, the exemplary embodiment may encode email address of the participant into an email identifier. The email address and email identifier of the participant may be stored in association with each other (or not). In addition, the texting number, texting identifier, email address, and/or email identifier may be stored in association with one or more of each other. An identifier for the event of the organizer (i.e., the name of the event) may be stored in association with the texting number, texting identifier, email address, and/or email identifier.

Still referring to FIG. 8a, the service provider checks in action 110 for the participant's participation in another event (current or previous) of the event organizer. If the participant participates or has participated in another event of the organizer, then in this embodiment, in action 112 the service provider includes the communications between the event organizer and the participant in the other event(s) as part of the conversational history between the organizer and the participant in the current event.

In action 116, if the service provider receives a message from the organizer for event participants, the service provider checks in action 118 to determine whether the event has started. If the event has not started, then in action 120 the service provider does not send the message. The service provider may respond to the organizer with information that the event has not started as yet or that the message will be sent when the event has begun.

If the event of the organizer has started as determined in action 118, then in action 122 the service provider determines if the event has ended. If the event has ended, the service provider does not send the message as shown in action 120. The service provider may respond to the organizer with information that the event has ended and no message will be sent.

If the event has not ended as determined in action 122, then in action 124 the service provider causes the message of the organizer to be sent as a text message to the texting numbers of the participants.

In action 126 as shown in FIG. 8b, if the service provider receives a message from a participant directed to the organizer's number, the service provider may repeat the process beginning with action 118 to determine whether the event has started. If the event has not started, the service provider does not send the message. Instead, the service provider may respond to the participant with information that the event has not started or that the participant's message will be transmitted to the organizer when the event has begun.

If the event has started as determined in action 118, then in action 122 the service provider checks whether the event has ended. If the event has ended, then in action 120, the service provider may respond to the participant with information that the event has not started or that the participant's message will be transmitted to the organizer when the event has begun.

If the event has not ended as determined in action 122, then in action 128 the service provider causes the message of the participant to be sent to the organizer In addition to monitoring for communications from the organizer and participant(s), the service provider may also monitor for the end time of an event in action 136. If the event has not ended, then the service provider continues to monitor for communications from the organizer and participants in action 116.

If the event has ended, in action 138 the service provider checks whether the participant(s) participate in another event of the organizer that ends later than the current event. If this event is the last ending event in which a participant participates, then in action 140 the participant's texting number is deleted. If this event is not the last ending event in which a participant participates, then in action 142 the participant's texting number is not deleted. The process may return to action 104 to monitor for event information received from the organizer and/or action 116 to monitor for messages.

Example of a Computer System or Network as May be Used to Implement the GATHER™ Service FIG. 9 illustrates an exemplary computer system 200 upon which an embodiment of the inventions may be implemented. An embodiment may be implemented on one or more such computer systems. Elements of a computer system may vary between embodiments of the inventions.

The computer system 200 includes a bus 202 or other communications mechanism for communicating information, and a processor 204 coupled with the bus 202 for processing information. The computer system 200 also includes a main memory 206, such as random access memory (RAM) or other dynamic storage device (e.g., dynamic RAM (DRAM), static RAM (SRAM), and synchronous DRAM (SDRA)), coupled to the bus 202 for storing information and instructions to be executed by the processor 204. In addition, the computer system 200 includes a read only memory (ROM) 208 and/or other static storage device (e.g., programmable ROM (PROM), erasable PROM (EPROM), and electrically erasable PROM (EEPROM)) coupled to the bus 202 for storing static information and instructions for the processor 204.

Further, the computer system 200 includes a disk controller 210 coupled to the bus 20 to control one or more storage devices for storing information and instructions, such as a magnetic hard disk 212, and a removable media drive 214 (e.g., floppy disk drive, read-only compact disc drive, read/write compact disc drive, compact disc jukebox, tape drive, and removable magneto-optical drive). The storage device may be added to the computer system 200 using an appropriate device interface (e.g., small computer system interface (SCSI), integrated device electronics (IDE), enhanced-IDE (E-IDE), direct memory access (SMA) or ultra-DMA).

The computer system may include special purpose logic devices (e.g., application specific integrated circuits (ASICs)) or configurable logic devices (e.g, simple programmable logic devices (SPLDs), complex programmable logic devices (CPLDs), and field programmable gate arrays (FPGAs)).

Also, the computer system 200 may include a display controller 216 coupled to the bus 202 to control a display 218 for displaying information to a computer user. The computer system 200 may include input devices, such as keyboard 220 and a pointing device 222, for interacting with a computer user and providing information to the processor 204. The pointing device 222 may be a mouse, a trackball, and/or a pointing stick for communication direction information and command selections to the processor 204 and for controlling cursor movement on the display 218. A printer (not shown) may provide printed listings of the data structures and/or information stored and/or generated by the computer system 200.

The computer system 200 may perform all or a part of the processing actions of the inventions in response to the processor 204 executing one or more sequences of one or more instructions contained in a memory, such as the main memory 206. The instructions may be read into the main memory 204 from another computer readable medium, such as a hard disk 212 or a removable media drive 214. One or more processors in a multi-processing arrangement may be employed to execute the sequences of instructions contained in main memory 206. In alternative embodiments, hard-wired circuitry may be used in place of or in combination with software instructions. Thus, embodiments are not limited to any specific combination of hardware circuitry and software.

As previously mentioned, the computer system 200 includes at least one computer readable medium or memory for holding instructions programmed according to the teachings of the inventions, and for containing data structures, tables, records, and/or other data described herein. Examples of computer readable media include compact discs, hard disks, floppy disks, tape, magneto-optical disks, PROMs (EPROM, EEPROM, flash EPROM), DRAM, SRAM, SDRAM, and/or any other magnetic medium, compact discs (e.g., CD-ROM), or any other optical medium, punch cards, paper tape, and/or other physical medium with patterns of holes, a carrier wave (described below), and/or any other medium from which a computer can read.

The inventions may include software for controlling the computer system 200, for driving a device or devices for implementing the inventions, and for enabling the computer system 200 to interact with a human user. The software may be stored on any one or on a combination of computer readable media. Such software may include, but is not limited to, device drivers, operating systems, development tools, and/or applications software. Such computer readable media further include the computer program product of the inventions for performing all or a portion (if processing is distributed) of the processing performed in implementing the inventions.

The computer code devices of the inventions may be any interpretable or executable code mechanism, including but not limited to scripts, interpretable programs, dynamic link libraries (DLLs), Java classes, and/or complete executable programs. Parts of the processing of the present invention may be distributed for better performance, reliability, and/or cost.

The term "computer readable medium" as used herein refers to any medium that participates in providing instructions to the processor 204 for execution. A computer readable medium may take many forms, including but not limited to, non-volatile media, volatile media, and transmission media. Non-volatile media includes, for example, optical, magnetic disks, and magneto-optical disks, such as the hard disk 212 or the removable media drive 214. Volatile media includes dynamic memory, such as the main memory 206. Transmission media includes coaxial cables, copper wire and/or fiber optics, including the wires that make up the bus 202. Transmission media may take the form of acoustic or light waves, such as those generated during radio wave and infrared data communications.

Computer readable media of various forms may be involved in carrying out one or more sequences of one or more instructions to processor 204 for execution. As an example, the instructions may be carried out on a magnetic disk of a remote computer. The remote computer may load the instructions for implementing all or a part of the inventions remotely into a dynamic memory and send the instructions over a telephone line using a modem or otherwise. A modem local to the computer system 200 may receive the data on the telephone line and use an infrared transmitter to convert the data to an infrared signal. An infrared detector coupled to the bus 202 may receive the data carried in the infrared signal and place the data on the bus 202. The bus 202 may carry the data to the main memory 206, from which the processor 204 retrieves and executes the instructions. The instructions received by the main memory 204 may optionally be stored on storage device 212 and/or 214 either before or after execution by processor 204.

The computer system 200 may include a communication interface 224 coupled to the bus 202. The communication interface 224 may provide a two-way data communication coupling to a network link 226 that is connected to, for example, a local area network (LAN) 228, and/or to another communications network 16 (see FIGS. 1*a-c*) such as the Internet. For example, the communication interface 224 may be a network interface card to attach to any packet switched LAN. As another example, the communication interface 224 may be an asymmetrical digital subscriber line (ADSL) card, an integrated services digital network (ISDN) card, and/or a modem to provide a data communication connection(s) to a corresponding type of communications line. Wireless links may also be implemented. In any such implementation, the communication interface 224 may send and receive electrical, electromagnetic, or optical signals that may carry digital data streams representing various types of information.

In the computer system 200, the network link 226 may provide data communication through one or more networks to other data devices. As an example, the network link 226 may provide a connection to another computer through a local network 228 (e.g., a LAN) and/or through equipment operated by a service provider, which provides communication services through a communications network 16. The local area network (LAN) 228 and the communications network 16 may use electrical, electromagnetic, and/or optical signals that carry digital data streams. The signals through the various networks and the signals on the network link 226 and through the communication interface 224, which carry the digital data to and from the computer system 200, are exemplary forms of carrier waves transporting the information. The computer system 200 may transmit and receive data, including program code, through the network(s) 228 and 16, the network link 226, and the communication interface 224. The network link 226 may provide a connection through the LAN 228 to a mobile device (not shown) such as a tablet (e.g., an iPAD tablet or mini iPad tablet), a personal digital assistant (PDA), a computer including a laptop or other portable computer, cellular telephone, and/or wireless unit or device. The LAN 228 and the communications network 16 may use electrical, electromagnetic, and/or optical signals that carry digital data streams. The signals through the various networks and the signals on the network link 226 and through the communication interface 224, which carry the digital data to and from the computer system 200, are exemplary forms of carrier waves transporting the information. The computer system 200 may transmit notifications and receive data, including program code, through the network(s) 228, 16, the network link 226, and/or the communication interface 224.

Additional information regarding email messages, text messages, SMS, wireless and landline communications, computer systems and environments, and other elements of the inventions may be obtained from the following patents, which are incorporated herein by reference: Rao, U.S. Pat. No. 8,428,645; Lin, U.S. Pat. No. 8,417,269; Clarke et al., U.S. Pat. No. 8,135,788; Clarke et al., U.S. Pat. No. 7,363,026; and Major, U.S. Pat. No. 7,151,932.

Conclusion

The foregoing describes the best mode and other examples. Various modifications may be made therein and the subject matter disclosed herein may be implemented in various forms and examples, and the teachings may be applied in numerous applications, only some of which have been described herein. It is intended by the following claims to claim any and all applications, modifications, and variations that fall within the scope of the teachings herein.

We claim:

1. A method for an event organizer to send a message to a participant in the event via text messaging to a texting number of the participant without the organizer being provided with the texting number, and for the message to be included in a conversational history between the event organizer and the participant in a later event of the organizer in which the participant participates, comprising:

causing the event organizer to be associated with an organizer's texting number;

receiving from the event organizer
  a start time and an end time for the event, and
  a designation of an electronic mail (email) address for an invitee to the event;

sending an email invitation on behalf of the event organizer to the email address of the invitee inviting the invitee to provide a texting number via responsive email if the invitee agrees to participate in the event as a participant and explaining to the invitee that the texting number will not be provided to the event organizer;

receiving the responsive email from the participant with the responsive email including the texting number of the participant;

encrypting the texting number of the participant as a texting identifier of the participant;

encrypting the email address of the participant as an email identifier of the participant;

storing the texting number of the participant and the texting identifier of the participant;

storing the email address of the participant and the email identifier of the participant;

receiving a message from the event organizer for the participant between the start time and the end time of the event;

causing the message from the event organizer to be sent as or as part of a text message to the texting number of the participant between the start time and the end time of the event, and causing the text message to appear as if the text message originated from the organizer's texting number;

when the end time of the event is reached, deleting the texting number of the participant, but not the texting identifier of the participant;

when the end time of the event is reached, deleting the email address of the participant, but not the email identifier of the participant;

after the event has ended and the texting number and email address of the participant have been deleted, receiving from the event organizer
  a start time and an end time for a later event, and the designation of the electronic mail (email) address for the invitee to the later event;

sending a later event email invitation on behalf of the event organizer to the email address of the invitee inviting the invitee to provide the texting number via a later responsive email if the invitee agrees to participate in the later event as a later event participant and explaining to the invitee that the texting number will not be provided to the event organizer;

receiving the later responsive email from the later event participant responsive to the later event email invitation to the later event of the event organizer with the later responsive email including the texting number and the email address of the later event participant;

encrypting the texting number in the later responsive email as a later texting identifier using the same encryption as encrypting the texting number in the responsive email;

encrypting the email address in the later responsive email as a later texting identifier using the same encryption as encrypting the email address in the responsive email;

comparing the later texting identifier to the texting identifier;

comparing the later email identifier to the email identifier;

if either the later texting identifier matches the texting identifier or the later email identifier matches the email identifier, then including the text message that was sent to the participant during the event as part of conversational history between the event organizer and the participant; and causing the conversational history between the event organizer and the participant to be selectively presentable to the event organizer and the participant during the later event.

2. The method of claim 1, wherein causing the event organizer to be associated with the organizer's texting number comprises assigning the event organizer the organizer's texting number or allowing the event organizer to choose the organizer's texting number from a list of texting numbers presented to the event organizer.

3. The method of claim 1, wherein encrypting the texting number of the participant as the texting identifier and the email address of the participant comprises encryption using the same one-way hash function; and wherein encrypting the texting number of the participant received in response to the invitation to the later event as the later texting identifier and encrypting the email address of the participant as the later email identifier comprises encryption using the same one-way hash function.

4. The method of claim 1, further comprising:

prior to deleting the texting number of the participant when the end time of the event is reached, determining that the participant is participating in another event of the event organizer with the other event having an end time later than the end time of the event; and instead of deleting the texting number of the participant at the end time of the event, storing the texting number of the participant at least until the end time of the other event.

5. The method of claim 1, further comprising:

receiving a text message sent by the participant to the organizer's texting number associated with the text message including a message for the event organizer; and transmitting the message from the text message sent by the participant to the event organizer.

6. The method of claim 1, further comprising:

at a selected interval of time prior to the end of the event, sending an end time warning message to the event organizer.

7. The method of claim 1, further comprising:

at a selected interval of time prior to the end of the event, texting an end time warning to the texting number of the participant.

* * * * *